(12) United States Patent
Kang et al.

(10) Patent No.: US 12,626,307 B1
(45) Date of Patent: May 12, 2026

(54) SYSTEMS AND METHODS FOR MODELING AND PREDICTING PROPERTY DAMAGE

(71) Applicant: State Farm Mutual Automobile Insurance Company, Bloomington, IL (US)

(72) Inventors: Christian T. Kang, Normal, IL (US); Ross Wheeler, Scottsdale, AZ (US); Kaleb W. Ringenberg, East Peoria, IL (US); Dustin Helland, Morton, IL (US); Ashish Sawhney, Bloomington, IL (US); Anjela Spreen, Hewitt, TX (US); Benjamin L. Clawson, Bloomington, IL (US); Douglas L. Dewey, Bloomington, IL (US); Joshua M. Mast, Bloomington, IL (US); Hanpei Zhang, Mesa, AZ (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 18/470,259

(22) Filed: Sep. 19, 2023

Related U.S. Application Data

(60) Provisional application No. 63/507,018, filed on Jun. 8, 2023, provisional application No. 63/486,563, filed
(Continued)

(51) Int. Cl.
*G06Q 40/00* (2023.01)
*G06Q 40/08* (2012.01)
(52) U.S. Cl.
CPC .................................... *G06Q 40/08* (2013.01)
(58) Field of Classification Search
CPC ...................................................... G06Q 40/08
See application file for complete search history.

(56) References Cited

U.S. PATENT DOCUMENTS 8,650,106 B1 2/2014 Hopkins, III
9,152,863 B1 10/2015 Grant
(Continued)

FOREIGN PATENT DOCUMENTS

CA 3119428 A1 * 5/2019 ............. G06Q 40/08
CN 109543670 A 3/2019
(Continued)

OTHER PUBLICATIONS

Saini et al: "Prediction of extent of damage to metal roof panels under hail impact", Engineering Structures, vol. 187, May 15, 2019, pp. 362-371 (Year: 2019).*
(Continued)

*Primary Examiner* — Edward J Baird
(74) *Attorney, Agent, or Firm* — Armstrong Teasdale LLP

(57) ABSTRACT

A roof assessment (RA) computing device may be programmed to store a roof assessment model within memory wherein the roof assessment model may be configured to determine a roof status of a selected roof after experiencing a weather event, output from the roof assessment model target weather event parameters for the selected roof wherein the target weather event parameters are weather event parameters that result in at least repairable damage to the selected roof, store the target weather event parameters in memory for the selected roof, determine that the selected roof has experienced a first weather event having weather event parameters that meet the target weather event parameters, and/or transmit a message to a user computing device associated with the selected roof advising that a claim associated with an insurance policy has been triggered as a result of the selected roof experiencing the first weather event.

18 Claims, 9 Drawing Sheets

1-2 Days

Related U.S. Application Data on Feb. 23, 2023, provisional application No. 63/484, 416, filed on Feb. 10, 2023.

(56) References Cited

U.S. PATENT DOCUMENTS

| | | | |
|---|---|---|---|
| 9,805,261 | B1 | 10/2017 | Loveland et al. |
| 9,886,771 | B1 | 2/2018 | Chen et al. |
| 10,061,470 | B2 | 8/2018 | Richman et al. |
| 10,169,856 | B1 | 1/2019 | Farnsworth et al. |
| 10,204,193 | B2 | 2/2019 | Koger et al. |
| 10,387,961 | B1 | 8/2019 | Burgess et al. |
| 10,497,250 | B1 | 12/2019 | Hayward et al. |
| 10,635,903 | B1 | 4/2020 | Harvey |
| 10,776,624 | B1 | 9/2020 | Harvey |
| 10,776,881 | B1 | 9/2020 | Harvey |
| 10,977,490 | B1 | 4/2021 | Bokshi-Drotar et al. |
| 10,991,049 | B1* | 4/2021 | Devereaux ................ G06T 7/73 |
| 11,107,162 | B1 | 8/2021 | Nussbaum et al. |
| 11,222,205 | B1 | 1/2022 | Harvey |
| 11,354,892 | B1 | 6/2022 | Harvey |
| 11,392,897 | B1 | 7/2022 | Gingrich et al. |
| 11,423,488 | B1 | 8/2022 | Harvey |
| 2006/0235611 | A1* | 10/2006 | Deaton .................. G01C 15/00 |
| | | | 701/491 |
| 2008/0052054 | A1* | 2/2008 | Beverina .............. G06Q 20/203 |
| | | | 703/6 |
| 2014/0118543 | A1 | 5/2014 | Kerbs et al. |
| 2014/0278573 | A1* | 9/2014 | Cook ................... G06F 16/256 |
| | | | 705/4 |
| 2014/0372360 | A1 | 12/2014 | Asrani |
| 2015/0302529 | A1 | 10/2015 | Jagannathan |
| 2016/0063527 | A1 | 3/2016 | MacDonald |
| 2017/0039307 | A1* | 2/2017 | Koger .................... G06F 30/23 |
| 2017/0124378 | A1 | 5/2017 | High et al. |
| 2017/0148102 | A1 | 5/2017 | Franke et al. |
| 2017/0154383 | A1* | 6/2017 | Wood ................... G06Q 40/08 |
| 2017/0249510 | A1 | 8/2017 | Labrie et al. |
| 2017/0270650 | A1* | 9/2017 | Howe ............... G06F 18/24133 |
| 2017/0352100 | A1 | 12/2017 | Shreve et al. |
| 2018/0068185 | A1* | 3/2018 | Schultz .................... G08G 5/34 |
| 2018/0075537 | A1* | 3/2018 | Kaplan ................. G06Q 40/08 |
| 2018/0247416 | A1 | 8/2018 | Ruda et al. |
| 2018/0336418 | A1* | 11/2018 | Splittstoesser ......... G06F 18/22 |
| 2019/0114717 | A1 | 4/2019 | Labrie et al. |
| 2019/0339093 | A1 | 11/2019 | Strickland |
| 2020/0309994 | A1 | 10/2020 | Eckel et al. |
| 2022/0051344 | A1 | 2/2022 | Dhuvur et al. |
| 2022/0172475 | A1 | 6/2022 | Hayman |
| 2022/0190940 | A1 | 6/2022 | Zaifman et al. |
| 2022/0198572 | A1 | 6/2022 | Aggarwal et al. |
| 2022/0292822 | A1 | 9/2022 | Splittstoesser |
| 2023/0110486 | A1* | 4/2023 | Patt ....................... G06Q 10/10 |
| | | | 705/4 |

FOREIGN PATENT DOCUMENTS

| | | |
|---|---|---|
| CN | 208722423 U | 4/2019 |
| CN | 110333325 A | 10/2019 |
| CN | 215987650 U | 3/2022 |
| CN | 114417672 A | 4/2022 |
| EP | 3200139 A1 | 8/2017 |
| WO | 2017091308 A1 | 6/2017 |
| WO | 2017116860 A1 | 7/2017 |
| WO | 2018087341 A1 | 5/2018 |
| WO | 2019092248 A1 | 5/2019 |
| WO | 2022251189 A2 | 12/2022 |

OTHER PUBLICATIONS

Dikshant Saini, "Prediction of extent of damage to metal roof panels under hail impact," 2019, Engineering Structures, 187, pp. 362-371. (Year: 2019).

"Authors et al., Method and System for Providing an IoT Drone Based Image Capturing of an Insurance User Base, Jun. 29, 2019, IP.com PAD, entire document" (Year: 2019).

* cited by examiner

600

602
RETRIEVING WEATHER INCIDENT DATA

604
RETRIEVING SUBJECT ROOF DATA ASSOCIATED WITH A ROOF

606
APPLYING THE RECEIVED ROOF DATA TO THE TRAINED ROOF ASSESSMENT MODEL TO GENERATE MODEL OUTPUT

608
DETERMINING A RECOMMENDATION BASED ON MODEL OUTPUTS

610
TRANSMITTING A MESSAGE

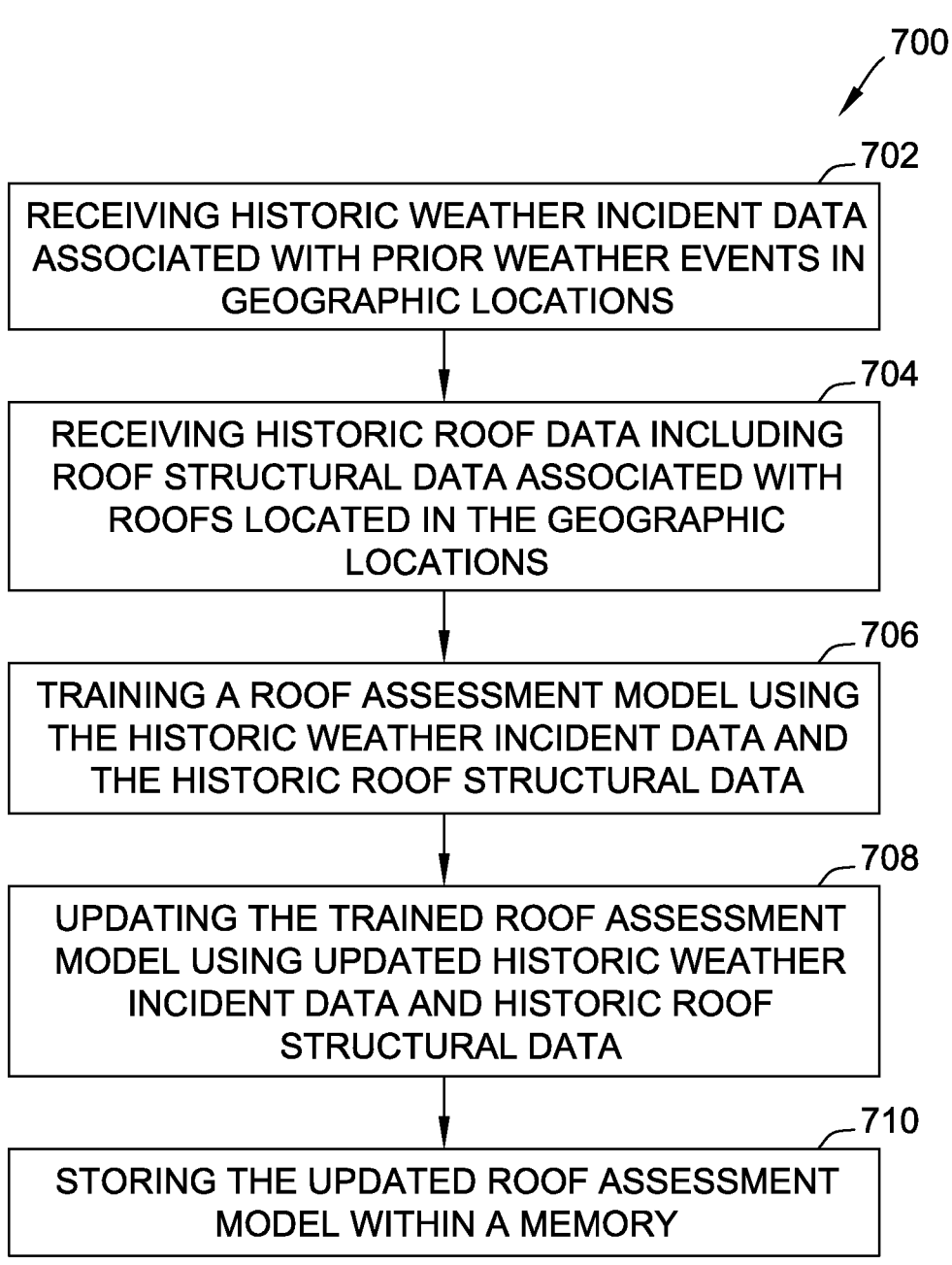

700

702

RECEIVING HISTORIC WEATHER INCIDENT DATA ASSOCIATED WITH PRIOR WEATHER EVENTS IN GEOGRAPHIC LOCATIONS

704

RECEIVING HISTORIC ROOF DATA INCLUDING ROOF STRUCTURAL DATA ASSOCIATED WITH ROOFS LOCATED IN THE GEOGRAPHIC LOCATIONS

706

TRAINING A ROOF ASSESSMENT MODEL USING THE HISTORIC WEATHER INCIDENT DATA AND THE HISTORIC ROOF STRUCTURAL DATA

708

UPDATING THE TRAINED ROOF ASSESSMENT MODEL USING UPDATED HISTORIC WEATHER INCIDENT DATA AND HISTORIC ROOF STRUCTURAL DATA

710

STORING THE UPDATED ROOF ASSESSMENT MODEL WITHIN A MEMORY

SYSTEMS AND METHODS FOR MODELING AND PREDICTING PROPERTY DAMAGE

CROSS REFERENCE TO RELATED APPLICATIONS

This application claims the benefit of priority to U.S. Provisional Patent Application No. 63/507,018, filed Jun. 8, 2023, U.S. Provisional Patent Application No. 63/486,563, filed Feb. 23, 2023, and U.S. Provisional Patent Application No. 63/484,416, filed Feb. 10, 2023, the contents and disclosures of which are hereby incorporated by reference herein in their entireties.

FIELD OF THE DISCLOSURE

The present disclosure relates to determining property damage after an incident and, more particularly, to systems and methods for modeling and predicting property damage resulting from an incident.

BACKGROUND

After an incident such as a weather incident, a policyholder may submit a claim to an insurance carrier regarding property damage resulting from the weather incident, which may then initiate a series of insurance claim processing steps. After a claim is filed, an insurance agent and/or insurance representative at a call center may intake the claim and schedule an in-person inspection of the property to assess the damage. The in-person inspection may be performed by a trained claims adjustor or a certified roof inspector, or some other person with specialized skills. The physical inspection may then be performed. After the inspection, an estimate, such as a handwritten estimate, and/or a claim settlement may be determined based at least in part on the inspection and a payment may be issued to the policyholder.

Scheduling an in-person inspection may be costly and may take some time to complete. Inspection times may include travel time and the time to perform the actual inspection, and policyholders may be waiting in a queue until an inspector is available to perform the in-person inspection. Inspection times may cause delays in the issuance of claim funds. Issuance of claim funds may be further delayed if a policyholder does not promptly file a claim because the claim processing steps, e.g., scheduling of an in-person inspection, may only be initiated after the policyholder files a claim.

Accordingly, there exists a need to more quickly, accurately, and simply assess property damage as a result of a weather incident to improve insurance processing to quickly and accurately issue a policyholder claim funds. Conventional techniques may include additional inefficiencies, encumbrances, ineffectiveness, and/or other drawbacks.

BRIEF SUMMARY

The present embodiments may relate to a roof assessment (RA) system for assessing potential damage to roofs and/or other structural components of a building. In certain embodiments, a computer system and computer-implemented method may include and/or may be associated with parametric insurance, such as parametric homeowner insurance, parametric roof insurance, parametric roof coverage or roof endorsements, or the like.

In one aspect, a roof assessment (RA) computing system may be provided. The system may include one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and other electronic or electrical components, which may be in wired or wireless communication with one another. For example, in one instance, a RC computing device may include at least one memory and at least one processor in communication with the at least one memory. The processor may be programmed to: (1) receive weather incident data associated with a weather event in a geographic location; (2) retrieve roof data including roof structural data associated with a roof in the geographic location, wherein the roof is associated with a policy stored in the at least one memory; (3) based upon the roof being associated with the policy, apply the roof data and the weather incident data to a trained roof assessment model configured to determine a roof status of the roof wherein the trained roof assessment model is trained using historic weather incident data and historic roof structural data; (4) receive an output from the trained roof assessment model wherein the output includes a recommendation to replace at least a portion of the roof based upon the roof status; and/or (5) based upon the recommendation, transmit a message to a user computing device associated with the policy that causes display of a claim selector at the user computing device wherein selection of the claim selector causes initiation of a claim associated with replacement of at least the portion of the roof. The computing device may include additional, less, or alternate functionality, including that discussed elsewhere herein.

In another aspect, a roof assessment (RA) computing device including at least one memory and at least one processor in communication with the at least one memory may be provided wherein the at least one processor is programmed to receive weather incident data associated with a weather event in a geographic location and/or retrieve roof data including roof structural data associated with a roof in the geographic location. The roof may be associated with a policy stored in the at least one memory. Based upon the roof being associated with the policy, the processor may be programmed to apply the roof data and the weather incident data to a trained roof assessment model configured to determine a roof status of the roof. The trained roof assessment model may be trained using historic weather incident data and historic roof structural data. The processor may be programmed to receive an output from the trained roof assessment model. The output may include a recommendation to replace at least a portion of the roof based upon the roof status. Based upon the recommendation, the processor may be programmed to transmit a message to a user computing device associated with the policy that causes display of a claim selector at the user computing device. Selection of the claim selector may cause initiation of a claim associated with replacement of at least the portion of the roof. The RA computing device may include additional, less, or alternate functionality, including that discussed elsewhere herein.

In another aspect, at least one non-transitory computer-readable storage media having computer-executable instructions embodied thereon may be provided. When executed by at least one processor, the computer-executable instructions may cause the at least one processor to receive weather incident data associated with a weather event in a geographic location and/or retrieve roof data including roof structural data associated with a roof in the geographic location. The roof may be associated with a policy stored in the at least one memory. Based upon the roof being associated with the policy, the computer-executable instructions may cause the processor to apply the roof data and the weather incident data to a trained roof assessment model configured to determine a roof status of the roof. The trained roof assessment model may be trained using historic weather incident data and historic roof structural data. The computer-executable instructions may cause the processor to receive an output from the trained roof assessment model. The output may include a recommendation to replace at least a portion of the roof based upon the roof status. Based upon the recommendation, the computer-executable instructions may cause the at least one processor to transmit a message to a user computing device associated with the policy that causes display of a claim selector at the user computing device. Selection of the claim selector may cause initiation of a claim associated with replacement of at least the portion of the roof. The at least one non-transitory computer-readable storage media having computer-executable instructions embodied thereon may include additional, less, or alternate functionality, including that discussed elsewhere herein.

In another aspect, a computer-based method may be provided including receiving weather incident data associated with a weather event in a geographic location and/or retrieving roof data including roof structural data associated with a roof in the geographic location wherein the roof is associated with a policy stored in the at least one memory. Based upon the roof being associated with the policy, the method may include applying the roof data and the weather incident data to a trained roof assessment model configured to determine a roof status of the roof. The trained roof assessment model may be trained using historic weather incident data and historic roof structural data. The method may include receiving an output from the trained roof assessment model. The output may include a recommendation to replace at least a portion of the roof based upon the roof status. Based upon the recommendation, the method may include transmitting a message to a user computing device associated with the policy that causes display of a claim selector at the user computing device. Selection of the claim selector may cause initiation of a claim associated with replacement of at least the portion of the roof. The computer-based method may include additional, less, or alternate functionality, including that discussed elsewhere herein.

In another aspect, a roof assessment (RA) computing device may be provided including at least one memory and at least one processor in communication with the at least one memory. The at least one processor may be programmed to receive historic weather incident data associated with prior weather events in geographic locations, receive historic roof data including roof structural data associated with roofs located in the geographic locations, train a roof assessment model using the historic weather incident data and the historic roof structural data based upon the geographic locations, update the trained roof assessment model using updated historic weather incident data and historic roof structural data, and/or store the updated roof assessment model within the at least one memory, the updated roof assessment model being configured to generate an output for a selected roof by inputting current weather incident data and current roof structural data for the selected roof, and wherein the output includes a roof status of the selected roof and a recommendation to repair or replace at least a portion of the roof based upon the roof status. The RA computing device may include additional, less, or alternate functionality, including that discussed elsewhere herein.

In another aspect, at least one non-transitory computer-readable storage media having computer-executable instructions embodied thereon may be provided. When executed by at least one processor, the computer-executable instructions may cause the at least one processor to receive historic weather incident data associated with prior weather events in geographic locations, receive historic roof data including roof structural data associated with roofs located in the geographic locations, train a roof assessment model using the historic weather incident data and the historic roof structural data based upon the geographic locations, update the trained roof assessment model using updated historic weather incident data and historic roof structural data, and/or store the updated roof assessment model within the at least one memory, the updated roof assessment model being configured to generate an output for a selected roof by inputting current weather incident data and current roof structural data for the selected roof, and wherein the output includes a roof status of the selected roof and a recommendation to repair or replace at least a portion of the roof based upon the roof status. The at least one non-transitory computer-readable storage media having computer-executable instructions embodied thereon may include additional, less, or alternate functionality, including that discussed elsewhere herein.

In another aspect, a computer-based method may be provided. The method may include receiving historic weather incident data associated with prior weather events in geographic locations, receiving historic roof data including roof structural data associated with roofs located in the geographic locations, training a roof assessment model using the historic weather incident data and the historic roof structural data based upon the geographic locations, updating the trained roof assessment model using updated historic weather incident data and historic roof structural data, and/or storing the updated roof assessment model within a memory, the updated roof assessment model being configured to generate an output for a selected roof by inputting current weather incident data and current roof structural data for the selected roof, and wherein the output includes a roof status of the selected roof and a recommendation to repair or replace at least a portion of the roof based upon the roof status. The computer-based method may include additional, less, or alternate functionality, including that discussed elsewhere herein.

In another aspect, a roof assessment (RA) computing device may be provided including at least one memory and at least one processor in communication with the at least one memory. The at least one processor may be programmed to store a roof assessment model within the at least one memory wherein the roof assessment model may be configured to determine a roof status of a selected roof after experiencing a weather event and wherein the roof assessment model is trained using historic weather incident data and historic roof structural data, output from the roof assessment model target weather event parameters for the selected roof wherein the target weather event parameters are weather event parameters that result in at least repairable damage to the selected roof, store the target weather event parameters in the at least one memory for the selected roof, determine that the selected roof has experienced a first weather event having weather event parameters that meet the target weather event parameters, and/or transmit a message to a user computing device associated with the selected roof advising that a claim associated with an insurance policy has been triggered as a result of the selected roof experiencing the first weather event. The RA computing device may include additional, less, or alternate functionality, including that discussed elsewhere herein.

In another aspect, at least one non-transitory computer-readable storage media having computer-executable instructions embodied thereon may be provided. When executed by at least one processor, the computer-executable instructions may cause the at least one processor to store a roof assessment model within the at least one memory wherein the roof assessment model is configured to determine a roof status of a selected roof after experiencing a weather event and wherein the roof assessment model is trained using historic weather incident data and historic roof structural data, output from the roof assessment model target weather event parameters for the selected roof wherein the target weather event parameters are weather event parameters that result in at least repairable damage to the selected roof, store the target weather event parameters in the at least one memory for the selected roof, determine that the selected roof has experienced a first weather event having weather event parameters that meet the target weather event parameters, and transmit a message to a user computing device associated with the selected roof advising that a claim associated with an insurance policy has been triggered as a result of the selected roof experiencing the first weather event. The at least one non-transitory computer-readable storage media having computer-executable instructions embodied thereon may include additional, less, or alternate functionality, including that discussed elsewhere herein.

In another aspect, a computer-based method may be provided. The method may include storing a roof assessment model within a memory wherein the roof assessment model is configured to determine a roof status of a selected roof after experiencing a weather event and wherein the roof assessment model is trained using historic weather incident data and historic roof structural data, outputting from the roof assessment model target weather event parameters for the selected roof wherein the target weather event parameters are weather event parameters that result in at least repairable damage to the selected roof, storing the target weather event parameters in the memory for the selected roof, determining that the selected roof has experienced a first weather event having weather event parameters that meet the target weather event parameters, and/or transmitting a message to a user computing device associated with the selected roof advising that a claim associated with an insurance policy has been triggered as a result of the selected roof experiencing the first weather event. The computer-based method may include additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIG. 7 illustrates a flow diagram of an exemplary computer-implemented method for updating a trained roof assessment model that may be implemented by the RA system described herein.

Figure 1:
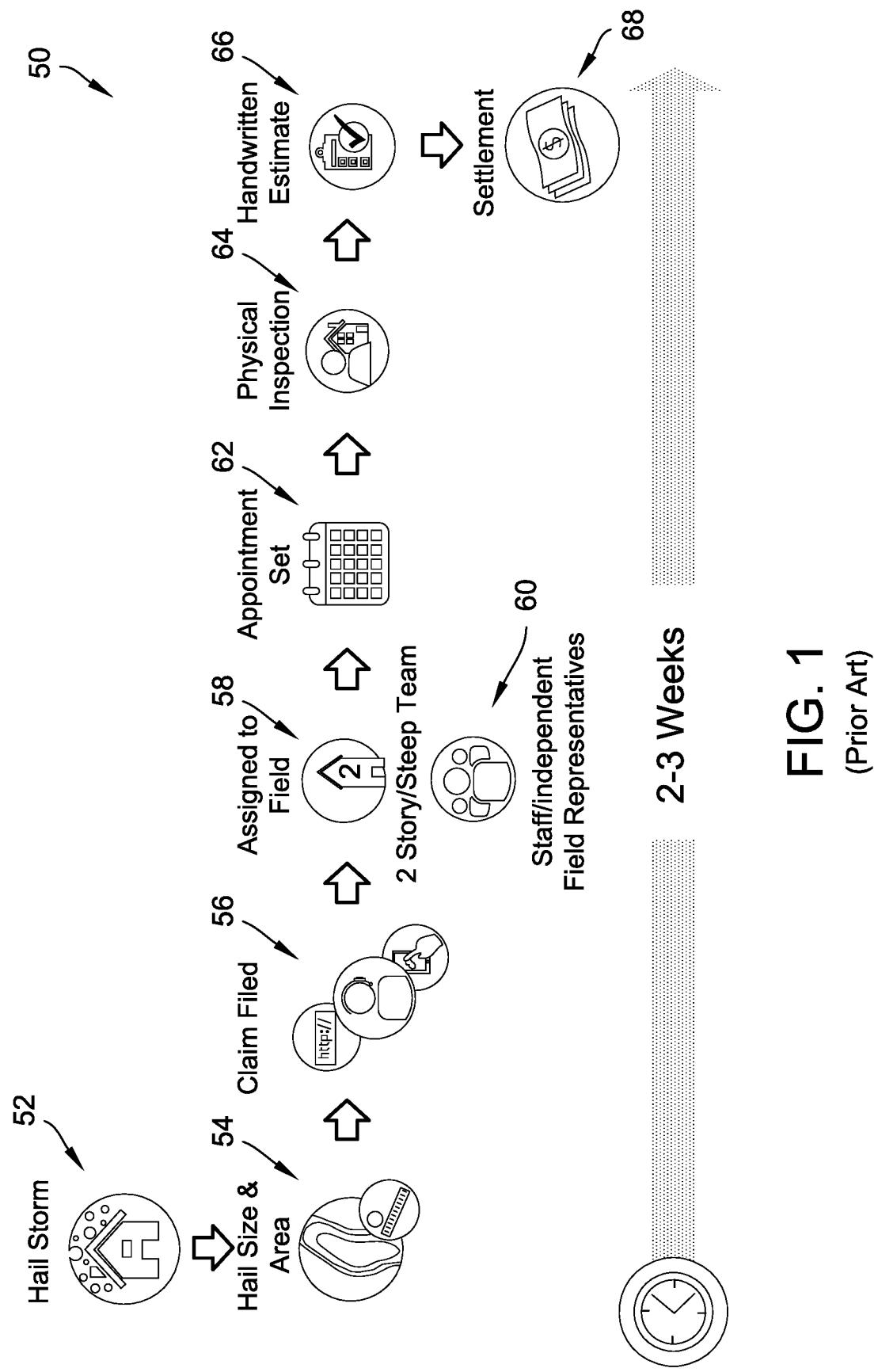
FIG. 1 illustrates a schematic of an exemplary process for determining property damage based upon a weather incident, including one or more known conventional processing steps.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for modeling and predicting a property status and/or property damage, and more specifically, determining a roof status or roof damage based upon a weather incident for insurance underwriting, and further based upon historic claim data associated with historic weather incidents, climate locality data, and/or roof structural data. Certain embodiments may relate to or be associated with parametric insurance or parametric roof insurance or endorsements, which may include issuing insurance payouts based upon sensor data and/or triggering events based upon computer analysis of sensor data.

After a severe weather incident, such as a hailstorm, tornado, flood, etc., a policyholder may submit a claim. The claim may be a formal request, by the policyholder, for compensation of a covered loss or policy event, e.g., property damage resulting from the weather incident. Submission of a claim may initiate a series of claim processing events that culminate, potentially, in compensation of the insured policyholder. Conventional claim processing events include submission of a claim and scheduling of a date and time for a claim adjustor to perform an in-person inspection to assess the property damage caused by the weather incident. Thus, conventional claim processing events may be both costly and time consuming.

Conventionally, the policyholder may initiate claim processing events, such as by submitting a claim. Additionally, a delay in claim submission after a weather incident contributes to claim processing times and, in some cases, may delay the compensation of the insured policyholder. Policyholders may delay submitting a claim for a variety of reasons, perhaps, because the policyholder's attention is drawn towards more pertinent issues resulting from the weather incident.

In another example, the policyholder may delay submitting a claim because the policyholder is unaware of the property damage caused by the weather incident. For example, a policyholder may not realize a roof needs repair until the next time it rains and the damage caused by the previous weather incident results in leakage of the roof. In another example, a policyholder may not realize a roof needs repair because they are not at the house, e.g., the policyholder is on vacation and/or otherwise out of town.

In-person inspections may include one or more of the following activities: a visual inspection, a collection of images and/or video of the damaged property, and/or a live stream video of the damaged property. The inspections may be performed by a person, such as a trained insurance adjustor, a roof inspector, a contractor, and/or a building inspector. The inspection may include one or more person(s) determining the extent, e.g., severity, of the damage, determining the region of the damage, determining a cost to repair and/or replace the damaged property, and/or determining a time required to repair and/or replace the damaged property. Accordingly, an in-person inspection to determine a property status may be both costly and time-consuming.

Systems and methods described herein address at least the aforementioned issues, e.g., cost and time associated with conventional claim processing, by determining a property status or property damage without requiring an in-person inspection and with limited data. A roof assessment (RA) system may be provided for determining a property status, in-real time and/or near real time, without an inspection, thereby expediting claim processing times, reducing costs associated with determining the property status (e.g., no travel costs, etc.), and increasing the accuracy of determining a property status. The RA system may determine the property status (e.g., whether a roof needs repair and/or replacement) immediately after and/or during the weather incident. In some embodiments, the RA system may determine the property status less than three hours after the weather incident, less than five hours after the weather incident, less than one day after the weather incident, and/or less than two days after the weather incident, for example. Accordingly, reimbursement funds may be issued quicker compared to conventional claim processing times, improving policyholder satisfaction and customer service.

For example, the RA system described herein may automatically and/or autonomously identify whether a roof needs repair and/or replacement based upon limited known data in the RA system and weather data regarding a weather incident (e.g., and no in-person inspection and/or other inspection of the roof). The RA system may identify whether to approve a potential claim (e.g., based upon a model output associated with a roof status), notify a policyholder of the potential claim, and automatically process the claim (e.g., including providing settlement funds to the policyholder and/or closing the claim) in real time upon receiving approval from the policyholder. In other words, whether or not a claim regarding a particular roof will be automatically approved may be automatically identified by the RA system before the claim is actually submitted such that, upon submission of the claim, the claim is automatically approved (e.g., based upon roof data and/or weather data).

Although the systems and methods may be described herein for determining a roof status, the systems and methods described herein may be used to determine a status of one or more structural components of a building, such as, but not limited to, a foundation status, a wall status, a window status, and/or other structural component status and/or a status of a structure other than a building such as a fence, pool, etc. The property and/or roof status is used for exemplary purposes only, and is not intended to limit the scope of the embodiments described herein.

A property status may be associated with property damage as a result of the weather incident. The property status may include a cost to repair or replace the property damage after a weather incident. The property damage may require repair and/or replacement of at least a portion of the roof, e.g., one or more shingles of the roof. The RA system may also determine a severity level for each determined property status. The severity level may be associated with a cost to repair and/or replace the property damage.

In some embodiments, the severity level may be associated with an amount of time required to repair and/or replace the roof status. For example, a high severity level may be associated with an increased cost and increased repair time as compared to a roof status having a lower severity level. In some embodiments, the severity level may be between zero and one, wherein a severity level of one indicates that the roof will need to be replaced in its entirety, e.g., complete failure. In some cases, the property status may have a severity level of zero, indicating that the weather incident did not cause damage. The severity level may be a percentage, e.g., a severity level of one is a 100% failure.

In the systems and methods described herein, trigger events may automatically cause the RA system to execute expedited claim processing events. A triggering event may include a weather incident and/or the submission of a claim by the policyholder. In some embodiments, the triggering event may include a weather incident satisfying a weather severity threshold. Additionally, and/or alternatively, a triggering event may include receiving and/or retrieving one or more claim requests from one or more secondary policyholders that are located in proximity to the policyholder. For example, multiple policyholders may be affected by a single weather incident, and if one or more policyholders submit claims for a weather incident, the RA system may determine other policyholders who have not yet submitted a claim that may have also been affected by the weather incident.

The weather incident data may be received via an application programming interface (API) associated with a weather service and be presented as a heat map, which relates weather severity levels with location data. The heat map may be presented in graphical format, showing a color-coded severity level gradient overlaid with a geographic map showing locations of active policies. In some embodiments, the heat map may be formatted in a table relating severity level with geographic location.

In some embodiments, the RA system may determine the property status prior to the submission of a claim by the policyholder. However, a determined property status and/or a determined cost may not be utilized until the policyholder formally submits a claim. For example, the determined status and cost may not be transmitted for further processing, transmitted to the policyholder, and/or funds may not be issued, until the policyholder submits a claim. Determining the property status and/or determining a cost (e.g., in real time with respect to receiving weather data) prior to the policyholder submitting a claim may reduce delays as the property status and/or cost are prepared in advance and are ready for when the policyholder eventually submits a claim. In some embodiments, the RA computing device may transmit one or more messages, e.g., to a computing device associated with the policyholder, prompting a policyholder to submit a claim (e.g., by selection of one or more selectors that are caused to be displayed on a user computing device).

The RA system may include a RA computing device. The RA computing device may include at least one processor and at least one memory communicatively coupled to the at least one processor. In some embodiments, the RA computing device may be associated with an insurance provider that provides insurance policies for properties, such as roofs and/or buildings. In other embodiments, the RA computing device may be associated with other parties.

The RA computing device may determine a roof status by applying subject roof data, weather incident data, and/or climate data to a trained roof assessment model. The RA computing device may be configured to store the roof assessment model. In some embodiments, the roof assessment model may be stored in the memory of the RA computing device. In other embodiments, the roof assessment model is stored in a historic database for subsequent retrieval.

In some embodiments, the RA computing device trains the roof assessment model using historical roof records. The RA computing device may be communicatively coupled to a historic database storing a plurality of historic roof records. In other embodiments, the RA computing device may be integrally formed with the historic database. The historic roof records, each associated with a historic roof, includes climate locality data, structural data, and claim data associated with an historic roof status resulting from a historic weather incident. The historic roof record may also include historic weather incident data, e.g., hail size, duration, etc.

The historic property status may be a result of the historic weather incident. For example, the historic property status may have been determined shortly, e.g., days or weeks, after the historic weather incident. Historic data, including the historic property status, may have been determined using any method, e.g., visual inspection, and/or evaluation of images and/or video of the historic roof.

In some embodiments, the RA computing device and/or the historic database may receive historic roof records from insurance providers and/or other parties. In some embodiments, the RA computing device may receive data from various sources and create the historic records which are stored in the historic database.

Historic roof records may include general roof data associated with a plurality of similar roofs. Similar roofs include roofs having similar structural data, the same climate locality as the roof of the historic roof record, and/or similar weather incident data. For example, the general roof data may include policy exposure, claim counts, and/or claim frequency for the plurality of similar roofs.

The historic roof status may include a severity level resulting from the historic weather incident. The severity level of the historic roof status may include a cost and/or time to repair the roof damage associated with the property status. In certain embodiments, the roof record may include a status description for the historic roof status. The status description may include insurance claim information and/or a severity description associated with the historic roof status. The status description may indicate to what extent the roof was damaged during the historic roof status. In one example, the status description may include "repairs recommended," and/or "totaled" (e.g., the cost to repair the damage is greater than the cost to replace the damage component of the roof). In another example, the status description may include a type of shingle failure, such as broken, lifted, splitting, shrinkage, curling, and/or granule loss.

Roof structural data, e.g., included in the historic roof records and/or in the subject roof data, may include an age of the roof (e.g., since installation) and/or roof material type (e.g., type of shingles and/or material composition of the shingles). In some embodiments, roof structural data may be obtained based at least in part on aerial imagery. Roof structural data may further include, but is not limited to, angle, pitch, or slant of the roof, roof slope, roof area (e.g., area of exposure), roof design, and/or other structural information, such as number of stories of the building having the roof, orientation of the structural elements of the roof, roof configuration, a roof installation identifier (e.g., yes/no, based upon a vendor inspection), number of roof material layers, number of layers of the roof, wind rating of the roof (e.g., based upon manufacturer reference materials), and/or a deck condition. Shingle type may include categories of asphalt composition shingles including three-tab and/or strip shingles (also referred to as traditional shingles), dimensional shingles (also referred to as architectural shingles), luxury shingles, and performance shingles.

The roof age may be the number of years/months/days since an installation date of the roof. In some cases, the roof age is the building year. The RA computing device may calculate the age of the roof based upon a roof installation date, e.g., until the weather incident occurred. Roof material may be associated with a manufactured defect present (e.g., based upon a vendor inspection) and roof material type may be associated with an impact testing rating (e.g., an impact resistant roofing (IRR) credit).

Roof structural data may also include environment parameters, such a roof occlusion. Roof occlusion may be associated with objects, such as trees and/or adjacent buildings, that may block, shield, or otherwise protect the roof during a weather incident. Roof occlusion may include tree coverage, such as number of trees, height of trees, proximity of trees, number of buildings, proximity of buildings, height of buildings, and/or other suitable environmental information.

The climate data, e.g., included in the historic roof records and/or in the subject roof data, may be received from one or more climate sources (e.g., via one or more APIs). The climate source may include, for example and without limitation, U.S. government funded data compiled by the Pacific Northeast National Laboratory and the Oakridge Laboratory for the U.S. Department of Energy's Building America Program. In some embodiments, the climate source may include the International Energy Conservation Code (IECC), International Residential Building (IRC) code, and/or the American Society of Heating, Refrigerating and Air-Conditioning Engineers (ASHRAE). In other embodiments, the RA computing device may receive climate data, directly or indirectly, from additional and/or alternative climate sources. The RA computing device may subsequently store the climate data within a climate database. In some embodiments, the RA computing device compiles the climate data retrieved from the climate source and/or stored in the climate database and the insurance data retrieved from the insurance computing device to generate a historic roof record.

U.S. climate regions are recognized by the Building America (BA) program and climate zones are recognized by the International Energy Conservation Code (IECC). The BA climate regions may be similar to the IECC climate zones. In the embodiments described herein, climate locality may refer to a climate region designated by the BA program and/or a climate zone designated by the IECC. The RA computing device may use alternative or additional climate locality designations.

The BA climate regions are based upon heating degree days, average temperature, and precipitation. The BA climate regions includes the following eight regions: BA Region 1: Hot-Humid; BA Region 2: Mixed-Humid; BA Region 3: Hot-Dry; BA Region 4: Mixed-Dry; BA Region 5: Cold; BA Region 6: Very-Cold, BA Region 7: Subarctic, and BA Region 8: Marine.

The IECC designates climate zones: Zone 1, Zone 2, Zone 3, Zone 4, Zone 5, Zone 6, Zone 7, and Zone 8. In addition, the IECC identifies three moisture regimes identified by the IECC including A: Moist, B: Dry, and C: Marine. Accordingly, the IECC designates a total of 11 total climate localities. The 11 climate localities include: Zone 0A Extremely Hot Humid, Zone 0B Extremely Hot Dry, Zone 1A Very Hot Humid, Zone 1B Very Hot Dry, Zone 2A Hot Humid, Zone 2B Hot Dry, Zone 3A Warm Humid, Zone 3B Warm Dry, Zone 3C Warm Marine, Zone 4A Mixed Humid, Zone 4B Mixed Dry, Zone 4C Mixed Marine, Zone 5A Cool Humid, Zone 5B Cool Dry, Zone 5C Cool Marine, Zone 6A Cold Humid, Zone 6B Cold Dry, Zone 7 Very Cold, Zone 8 Subarctic/Arctic.

The weather incident data, e.g., included in the historic roof records and/or in the subject roof data, may be received from one or more weather sources via one or more APIs. The weather source may include a vendor weather service international (e.g., AccuWeather (AW)) and/or the National Weather Service (NWS). In other embodiments, the weather source may be any suitable source. The weather sources may be separate from the climate source. The weather source may provide weather incident data associated with a specific and/or isolated weather incident. Weather incident data may be retrieved and/or received in real-time as the weather incident is unfolding and/or immediately, e.g., less than 2 hours, less than 1 hour, less than 10 min, after the weather incident has transpired. Alternatively and/or additionally, weather incident data may be retrieved and/or received periodically and/or continuously, e.g., every 5 min, every 10 min, and/or every hour from the weather source.

Weather incident data may include any one or more of the following: weather incident signature, a date and time, e.g., start time and/or an end time, at which the weather incident occurred, and a duration of time over which the weather incident occurred. Weather incident data may include one or more of the following data: hail size, wind speed, wind direction, pressure, and temperature. Weather incident data may include a heat map indicating a severity of the weather incident relative to a location of the weather incident. For example, the heat map may include hail sizes and/or hail distribution (e.g., what size hail fell over what areas) in a specific location. Hail size may include hail weight, hail diameter, hail shape (e.g., smooth, jagged, and/or spiked etc.), hail volume, hail hardness (e.g., a measure of resistance against deformation upon impact and/or the hail's resistance to flexing), and/or hail density (e.g., how compact the ice is). For example, layers of ice may accumulate as a hailstone grows within a storm. Often, air bubbles can be trapped in these layers making the hailstone less dense and/or "softer."

In some cases, the weather incident may be the primary cause of the property damage, however, secondary factors such as roof structural data and/or climate data may contribute to the property damage or make the property more susceptible to damage caused by a weather incident. For example, for a specific weather incident, an older roof may be more easily damaged than a younger roof.

In some embodiments, the RA system may include an application program interfaces (API) e.g., and/or a plurality of APIs. The API may be executed by the RA computing device, and/or one or more computing devices associated with the user and/or the insurance entity. The API may facilitate communications, e.g., encrypted communications, between the various entities of the RA system. In some embodiments, the API may display and/or present information and/or the API may provide a platform of acceptance and/or denial of one or more inputs, e.g., queries, requests, and/or confirmations.

In some embodiments, the weather sources, e.g., commercial vendor weather service international and/or the National weather service (NWS), may transmit one or more messages to computing devices using the API. For example, a weather incident may trigger the weather source to transmit the one or more messages, e.g., an alert message, to the RA computing device and/or a computing device associated with a user and/or an insurance provider. In some embodiments, the RA computing device may receive weather incident data by executing an API to access the weather incident data from a weather source.

The API may transmit weather incident data, e.g., hail size, location, and/or a weather heat map. The weather heat map may include a relationship between location data and a severity of weather incident data, e.g., hail size. In some embodiments, the weather heat map may be displayed as a color-coded scale of severity level (e.g., red-increased severity and blue-low severity) overlaid onto a locational map of a region in which the weather incident occurred. The heat map may include one or more regions on a location map that are circumscribed by a polygon and are color-coded with the same severity level.

In some embodiments, the heat map may provide a relationship between policyholder information and the severity of weather incident data. For example, the heat map may relate a policyholder's house location relative to a severity level of the weather incident data. In some embodiments, the heat map may be displayed as a color-coded scale of severity level (e.g., red-increased severity and blue-low severity) overlaid onto a locational map of active policyholder's locations for a region in which the weather incident occurred.

Using the weather incident data and/or the weather heat map data, the RA computing device may be triggered to retrieve policyholder data, e.g., roof data, for policyholder's affected by the weather incident. For example, the RA computing device may retrieve policyholder data from one or more sources, e.g., a Fire Master Record database and/or a commercial weather vendor (e.g., Cape Analytics), for example. The RA computing device may retrieve policyholder data from any suitable source, e.g., a computing device associated with a user and/or an insurance provider.

In some embodiments, the RA computing device may generate, e.g., train, the roof assessment model for determining a property status using a training dataset that includes one or more training variables, e.g., model parameters, such as roof status, weather incident data, climate data, and/or roof structural data. The training dataset may include the historic roof records or a subset of the historic roof records.

In other embodiments, the RA computing device may generate the roof assessment model in a different format. For example, the roof assessment model may be a function for receiving data for a subject roof and generating an output for determining a roof status of the roof.

The RA computing device may be configured to generate the roof assessment model by analyzing the historic roof records. The RA computing device may be configured to perform a statistical analysis of the historic roof records to generate the roof assessment model. For example, for a particular type of climate locality, the RA computing device may average the corresponding historic roof records for roofs located in that particular climate locality together to generate a model parameter. In other embodiments, the RA computing device may be configured to perform a different analysis that is suitable to generate the roof assessment model.

The roof assessment model may be associated with and/or include a parametric engine. The parametric engine represents a relationship between input data, e.g., training variables, and predicted outputs. The training variables may be parameterized allowing the parametric engine to be tuned to generate accurate outputs. Parameterized training variables may be weighted using weighting coefficients. The parametric engine may be tuned to determine a magnitude and/or a direction of the weighting coefficients. Tuning may include iteratively using the parametric model to generate model outputs that correspond to an actual event, e.g., a historic event, while adjusting the magnitude and direction of the weight coefficients until the error between the model output and the actual event is reduced to an acceptable level. Tuning may be performed in addition to, and/or in combination with, training the model using historic data.

The parametric engine may use the weighted coefficients to rank an importance or influence of a model training variable. For example, the greater the weighting factor the greater the importance the RA computing device will associate with that variable when tuning the model. Likewise, the smaller the weighting factor the lesser the importance that the RA computing device will associate with the variable when tuning the model. In some embodiments, the RA computing device may weight variables associated with the weather incident data greater than any other model training variables.

For example, the RA computing device may weight the weather incident data of the historic roofs with a weight factor, e.g., suitably greater than 50%, suitably greater than 75%, and/or suitably greater than 90%. In another example, the RA computing device weights the weather incident data with the greatest weight factor, greater than the weighting factors than any of the other model training variables. In another example, the RA computing device weighs the weather incident data and the roof structural data with the greatest two weighting factors, e.g., greater than the weighting factor for any of the other model training variables.

In some embodiments, the RA computing device may use a reduced number of training variables, e.g., one or more training variables, that have the greatest weighting factors, e.g., the variables that are ranked with the most importance. The reduced and more focused training dataset, including the training variables with the greatest weights, decreases computational load and will have decreased model training time allowing the model to be more quickly updated as more historic roof records are created and added to the subset training dataset. The RA computing device may generate a training dataset including less than five model training variables and/or less than three model training variables, for example.

The RA computing device may also determine a confidence score for one or more of the model outputs. The confidence score may be associated with a percent likelihood a determined property status is a correct assessment of the property damage. For example, the confidence score may be between zero and one. A confidence score close to one, e.g., greater than one-half, indicates that the determined property status likely accurately reflects the actual property damage.

Preferably, a property status with a confidence score of one, indicates that the model determined property status is the same, or substantially the same, as an assessment of the property damage determined by an in-person inspection. For example, a cost associated with the property status, as predicted by the model would match, or substantially matches, a cost determined by an in-person inspection, and/or the actual cost to repair the damage.

In some cases, the RA model may predict a property status more accurately than a roof assessment performed by a conventional in-person inspection. The model predicted cost may be within ±$100.00, or within ±$1000.00, for example, compared to the actual cost, or the in-person inspection predicted cost. In some cases, the model predicted cost may be within ±5%, and/or within ±10%, of the actual cost or the in-person inspection predicted cost.

In some embodiments, the RA computing device may be configured to provide information associated with the determined roof status to an insurance provider associated with an insurance policy of the roof to facilitate processing an insurance enrollment and/or determination of insurance premiums. In some embodiments, the RA computing device may be communicatively coupled to one or more insurance computing devices associated with one or more insurance providers. The insurance computing devices may be configured to receive, generate, and/or otherwise process insurance enrollment and purchasing. In other embodiments, the RA computing device may be an insurance computing device.

The RA computing device may perform a roof assessment process by receiving subject roof data associated with a subject roof and applying the subject roof data to the trained, and/or tuned, roof assessment model. For example, a user, such as an owner of the subject roof, may desire to obtain an insurance quote for the subject roof. As such, the user computing device may transmit subject roof data to the RA computing device.

In at least some embodiments, the RA computing device may be configured to prompt a user associated with the subject roof to provide roof data and/or submit a claim. In such embodiments, the RA computing device may be communicatively coupled to a user computing device associated with the user. The RA computing device may transmit prompts and/or questions to the user computing device for display to the user. The user may answer the prompts and/or questions and transmit a response back to the RA computing device.

In certain embodiments, the user computing device may be configured to capture image data, video data, and/or audio data of the roof and transmit the data to the RA computing device for analysis. Additionally, or alternatively, the RA computing device may be configured to retrieve subject roof data for a building from other suitable data sources. The RA computing device may be configured to perform image and/or audio analysis on the received data to extract the subject roof data. That is, the RA computing device may be configured to detect points of interests from the data and extract roof data by analyzing the points of interest. The RA computing device may be able to determine a geographic location of the subject roof, for determining a climate locality, based upon data received from the user computing device.

Additionally, and/or alternatively, the RA computing device may also retrieve subject roof data, e.g., from an insurance computing device, in response to a claim submission by the user. For example, the RA computing device may identify potential roof damage for a user property (e.g., based upon weather data received via an API and the roof data) and prompt a user to submit a claim. For instance, in some embodiments, claim processing and/or analysis may not begin until a claim is submitted. In some embodiments, the RA computing device identifies an amount of roof damage (e.g., and whether or not the roof will need replacement) before a claim is submitted by a user. However, payment to the user and/or processing of the claim will not commence until a claim is submitted by the user. Thus, to expedite the claims process, the RA computing device may prompt or otherwise provide an offer for the user to submit a claim based upon the analyses as described herein.

In some embodiments, the roof and/or the building may include a sensor system for monitoring and/or determining roof data of the roof. The sensor system may include one or more sensors that collect sensor data associated with the roof. In certain embodiments, at least some sensors may be integrated within structural components of the roof.

At least some of the sensors may be configured to collect sensor data that may be used by the RA computing device as roof data. For example, a sensor may be configured to detect roof structural data, such as a roof material, shingle type, and/or roof geometry. The sensor system may be communicatively coupled to the RA computing device to transmit the sensor data as roof data. The sensor system may include a computing device in communication with the RA computing device. In other embodiments, the sensor system may be communicatively coupled to a different computing device (e.g., the user computing device) that retrieves the sensor data. In such embodiments, the RA computing device may retrieve the sensor data from the computing device.

Upon collection of the subject roof data, the RA computing device may retrieve the roof assessment model for evaluating the collected subject roof data. The evaluation may include applying the subject roof data to the roof assessment model. The roof assessment model may output one or more roof statuses. In some cases, one or more property statuses may be generated for a single property and/or roof, for example, various property statuses may be generated for various regions of the roof, e.g., a property status of an eastern facing side of the roof and/or a property status for a western facing side of the roof. Each of the determined roof statuses may include a severity level associated with the roof statuses and/or a status description. In some embodiments, the RA computing device may output a recommendation (e.g., an amount of funds that may be automatically approved upon a claim submission) based upon the determined property status.

The determined property status may then be transmitted to the insurance computing device for performing one or more operations associated with providing a claim fund to compensate the policyholder. In some embodiments, the determined roof status is stored until a policyholder submits a claim. In some embodiments, the RA computing device may perform one or more underwriting operations associated with providing an insurance quote. In some embodiments, the RA computing device may transmit data, e.g., a claim funds quote and/or one or more roof statuses to the user associated with the building. Contact information for the user may be retrieved from the subject roof data of the roof, contact information provided for an insurance policy of the roof, and/or other data sources that store contact information. In some cases, funds may be routed directed to an account of the policyholder.

In some embodiments, the API may be used to transmit the determined property status. For example, the API may cause the user computing device to present the determined property status. In some embodiments, the API may cause the user computing device to prompt the user to perform one or more actions. For example, the API may prompt the user to initiate a claim. The weather incident data and/or heat map data may trigger the API to transmit one or more messages to the RA computing device and/or the user computing device, causing the user computing device to display a prompt including an indication that a weather incident occurred that may have affected a covered loss of a policyholder.

The prompt may request that the user confirm a claim submission for the covered loss (e.g., by selecting a selector that is caused to be displayed). For example, the prompt may request that the user selects at least one of a yes (e.g., proceed) selector or a no (e.g., decline) selector of the claim submission.

After the RA computing device has determined the property damage, and/or after the user has confirmed the initiation of a claim submission, the API may transmit one or more messages that prompt the user to accept settlement funds associated with the determined property damage. The API may cause the user computing device to present the funds amount to a user and a prompt requesting the user to select at least one of a yes (e.g., accept issuance of funds) selector or a no (e.g., decline the issuance of funds) selector. In some embodiments, if the user selects yes, the settlement funds may be issued such that the funds are directly deposited, e.g., electronic deposit, in a financial account of the policyholder.

In some embodiments, the API may submit prompts and/or information using text messaging and/or, the API may present information and/or prompts using a graphical user interface.

In other words, the RA system described herein may automate the claim handling process for certain events by automating damage detection, producing a claim estimate, making customer contact, and making payment (e.g., in real time). The RA system may leverage hail-size-to-roof-material rules, derived from historical claims, policy, and weather data, that are run through a parametric engine (e.g., model) to determine whether a roof should be replaced automatically (e.g., or requires physical inspection) after a hail weather event. Thus, the claim handling process for damage may be reduced in duration.

The RA system may also be configured to provide certain remedial or corrective actions. For instance, the RA system may be configured to estimate home or roof damage; identify or suggest damaged roofs; to interact with unmanned aerial vehicles or drones (such as to gather aerial images of damaged properties); identify roofs for human or automated inspection, identify roof type and age; identify roofs that need shingles removed or replaced; schedule repairs or maintenance; notify insureds of damage and/or damage estimates; provide insurance providers and/or insureds or homeowners with first notice of loss (FNOL); transmit monies to the insured or homeowner; automate repairs; automate the sending of drones or planes to fly over damaged properties and acquire images of damaged homes or roofs, and verify and estimate the extent of damage; and/or other functionality discussed herein.

From a customer (e.g., user, policyholder, etc.) perspective, satisfaction in the claim process is improved by implementation of the RA system. For example, customers may want a simple, fast, and flexible experience after a loss occurs. The RA system may automatically determine if hail roof damage has occurred after a trigger event such as a storm. thereby reducing the claim cycle time for the policyholder by eliminating the need to send an adjuster onto a roof to assess damage and determine coverage.

From an insurance provider perspective, operating costs may be reduced by eliminating the need for in-person assessment on the roof and automation of a manual process freeing claim handler capacity for other work. Further, assessment accuracy may be increased and human error may be reduced. The amount of workplace injuries may also be reduced. Accordingly, insurance provider handling of claims with customers may be prompt and accurate.

Certain data may be obtained and/or gathered from memory by the RA computing device described herein. For example, weather data (e.g., obtained via one or more APIs from a commercial weather vendor or National Weather Service (NWS)) may include hail size, hail location, hail date, wind speed, wind direction, and/or temperature. Roof data (e.g., obtained from a stored property and/or real estate and/or property data sources from a vendor (e.g., CAPE Analytics, Estated, etc.)) may include roof material, roof occlusion, roof pitch, and/or roof size (e.g., different from a property outline). For damage verification/validation, claims data may be utilized that includes certain identifiers and/or codes such as roof replaced (e.g., y/n), reason code (e.g., total roof replacement (TRR) or partial replacement (PR)), RCBs (e.g., y/n), a payment made code (e.g., indicating whether a payment was made), a comment code (e.g., indicating whether any additional comments are stored), and/or other data necessary (e.g., from feedback & input).

Certain data may also be utilized when building and/or training the roof assessment model described herein. For example, correlations between weather data and property data may be compared against past claims decisions to provide a percentage of roofing being damaged/undamaged (e.g., for different weather events). As examples, utilized data may include codes (e.g., a combination of a code indicating a roof replacement for hail (not wind) and/or codes associated with the following categories) such as hail size, roof pitch and hail size, roof obscured (e.g., if hail had the opportunity to be blocked by a tree did it still warrant a replacement) greater than hail size, RCB paid prior claim (e.g., replacement cost benefits indicator "y" if roof was paid), hail >1.75 and claim selected for PLH (potential large hail) handling, total confidence scores of every parameter to an applicable risk assessment/accuracy-of-concept score to determine an acceptable appetite for running the model in real world production based upon past results and/or proof that the concept improves current methodologies. Further data utilized may include certain roof characteristics (e.g., whether the feature and/or material is included in the roof) such as felt, starter strip, ridge cap, ice/water membrane, drip edge/gutter apron, 5" gutter, appurtenance count, depreciation, gutter detection along eaves, chimney.

The RA system may also automate estimate writing based upon the data described herein. For example, roof data (e.g., roof type, roof measurements, roof condition (depreciation), gutter presence, appurtenance count) may be inputted into the model along with policy data (e.g., associated with an insurance policy) and/or weather data. The model may then output an estimate based upon results with deprecation. A PDF or physical copy, with dollar amount for payment (total replacement cost value minus deductible minus depreciation) may be generated along with an automatic email (e.g., email address gathered from policy data) of an estimate to claim file (drop file folder or specified address) and send to the policyholder.

Settlement may also be automatically handled by the RA system (e.g., upon receipt of a claim). For example, the RA system may initiate an electronic funds transfer (EFT) to a checking account on file of the policyholder. In some embodiments, presentation of a value of the roof that is being replaced may be transmitted to a claim representative for a manual decision and/or presentation of the claim file may be autonomously handled by the RA system to a specific point before being automatically turned back over to claims.

While the RA system may pre-emptively identify roofs that may need replacement upon the occurrence of a certain weather event, in some embodiments an option of requiring "notice of claim" may be implemented (e.g., as selected by policyholders) wherein a claim must first be filed (e.g., through conventional means) before the model is triggered with respect to a property associated with those policyholders. Additionally/alternatively, in some embodiments, the RA system may proactively notify policyholders based upon model outputs and weather events associated with those model outputs occurring (e.g., model identifies roof replacement if weather event X occurs, and then weather event X occurs).

In some embodiments, an ETF process using on-file checking numbers and routing numbers for policyholders may allow for automatic transfer funds into an account upon settlement and prior to claim process completion (e.g., while a policyholder is still on the phone with a representative).

In some embodiments, aspects of the RA system may be implemented for other claims such as wind claims (e.g., based upon wind speed, roof material, occlusion and other variables), interior claims (e.g., based upon crowd sourced policyholder photos through an app/run through Computer Vision to detect damage (water spots on drywall, smoke/fire damage, flooring damage, etc.), cell phone measurement feature through insurance app, artificial intelligence (AI)/machine learning (ML) identifying interior building materials through supplied photos) and/or auto claims (e.g., damage detected through app-supplied images and verified with Computer Vision, repair estimates based upon vehicle make, model, market location to be repaired, severity of damage, etc.).

In sum, the RA system may significantly reduce the time from a hail storm to settlement for the customer, may eliminate the need for a roof inspection, and may limit policyholder interaction with the insurance carrier. The RA system may also improve employee safety by eliminating roof inspections/walking on roofing and reduce claim operational expenses enabling representatives to do fewer roof inspections and thus handle more claims. Vast claims historical data may be utilized, and specific and detailed rules may be generated and utilized to be able to drive automated roof damage decisions based upon weather and digital property data in a very short amount of time, thereby eliminating/improving a process that currently takes weeks and months.

In the example embodiment, when a hail storm occurs, weather data may be received that serves as a triggering event for the RA system. The weather data may be received by an Application Programming Interface (API) wherein the weather data includes hail sizes and location (e.g., a heat map of the hail sizes and where they fell). That information is then overlaid with active policy (e.g., insurance policy) locations in a polygon based upon Fire Master Record (FMR) data. Property roofing characteristic information may be pulled. All of these data points may then be run through a parametric engine (e.g., a model) that determines, based upon all the data parameters and rules (e.g., hail size, roof material, roof condition, roof slope, prior claim outcomes for hail this size on roofing of this kind/quality in the past, etc.) whether or not to replace the roof, and if not, to send a representative (e.g., the "yes/no" answer for replacement). In some embodiments, an automated roof estimate may be created and an actual cash value settlement electronic fund may be transferred to the bank account on file of the policyholder.

The example embodiment may take, at minimum, just the roof damage decision from weeks/months in its current state, to a matter of hours/minutes/seconds depending on how quickly the triggering data is received and the size of the storm (e.g., and therefore processing time). An insurance provider may then be able to notify a customer that there may be damage to the house via text or email, and upon the response of the customer ("y" to proceed or "n" to decline) would initiate the settlement, or allow in-office partners to write roof estimates instantly without delay and send ACV (actual cash value) checks. In other words, no representatives, no waiting, no roofing salesmen, no inspection scheduling and fewer contact points are required. Further, fewer training mistakes (e.g., representatives identifying hail), fewer workplace injuries, more inspections per day per representative, lowered operating costs, shorter deployments for adjusters, better work/life balance, and customer and employee satisfaction may be provided.

At least one of the technical problems addressed by this system may include: (i) time-consuming, labor-intensive, and costly determination of the status of a property resulting from a weather incident, including requiring one or more persons, e.g., policyholders and insurance agents etc., to perform one or more claim processing events e.g., submitting a claim and/or performing an in-person inspection to determine a roof status; (ii) extended processing times for determining a roof insurance quote or issuance of a payment to the claim holder; (iii) incomplete roof assessment causing increased cost for both policyholders and insurance providers; and/or (iv) limited quantitative analysis of roof assessments relative to historic data associated with historic roofs, historic weather incidents, and locality climate data.

The technical effect achieved by this system may be at least one of: (i) increased accuracy when assessing a potential roof status; (ii) reduced processing time and costs associated with generating insurance quotes and/or claim processing events; and (iii) increased quantitative analysis of a roof status based upon weather incident data, climate locality, roofing material, and shingle type.

A technical effect of the systems and processes described herein may be achieved by performing at least one of the following steps: (i) retrieving weather incident data; (ii) retrieving subject roof data associated with a roof; (iii) applying the received roof data to the trained roof assessment model to generate model outputs; (iv) determining a recommendation based upon model outputs; and (v) transmitting a message.

Conventional Roof Assessment Process

FIG. 1 depicts a method 50 for processing a claim including one or more conventional steps. After a weather incident 52, hail size and area measurements 54 may be made (e.g., manually) and a policyholder may submit a claim 56 formally requesting compensation of a covered loss or policy event, such as property damage resulting from weather incident 52. Submission of claim 56 initiates a series of processing events that culminate, potentially, in issuance of funds, to an insured policyholder. The policyholder may submit a claim by, for example, calling an insurance representative or submitting a claim via an insurance website. After the claim submission, method 50 includes manually assigning 58 (e.g., by an insurance representative) field representatives 60 to inspect the alleged property damage and manually scheduling 62 a date and time for field representatives 60 to perform an in-person inspection of the property in order to assess property damage caused as a result of weather incident 52. Next, method 50 includes the field representatives traveling to the property to perform an inspection 64.

Based upon inspection 64, a handwritten estimate 66 is provided to the policyholder and, eventually (e.g., based upon further manual analysis by insurance representatives) a settlement 68 may be provided.

Notably, the time and financial costs associated with method 50 are significant. For example, significant time costs include scheduling 62 an inspection, traveling to the property, and/or performing inspection 64, may be substantial considering wage compensation of the field representatives 60, and travel costs. In addition, method 50 may take time to schedule 62 an inspection, travel to the property, perform inspection 64, process inspection 64 and assess the damage, determine a cost associated with the damage, and compensate the insured policyholder (e.g., greater than two weeks, and/or greater than a month, depending on the complexity of the assessment, the location of the property, and/or waiting time based upon queue position of the policyholder).

Exemplary Roof Assessment (RA) System

Figure 2:
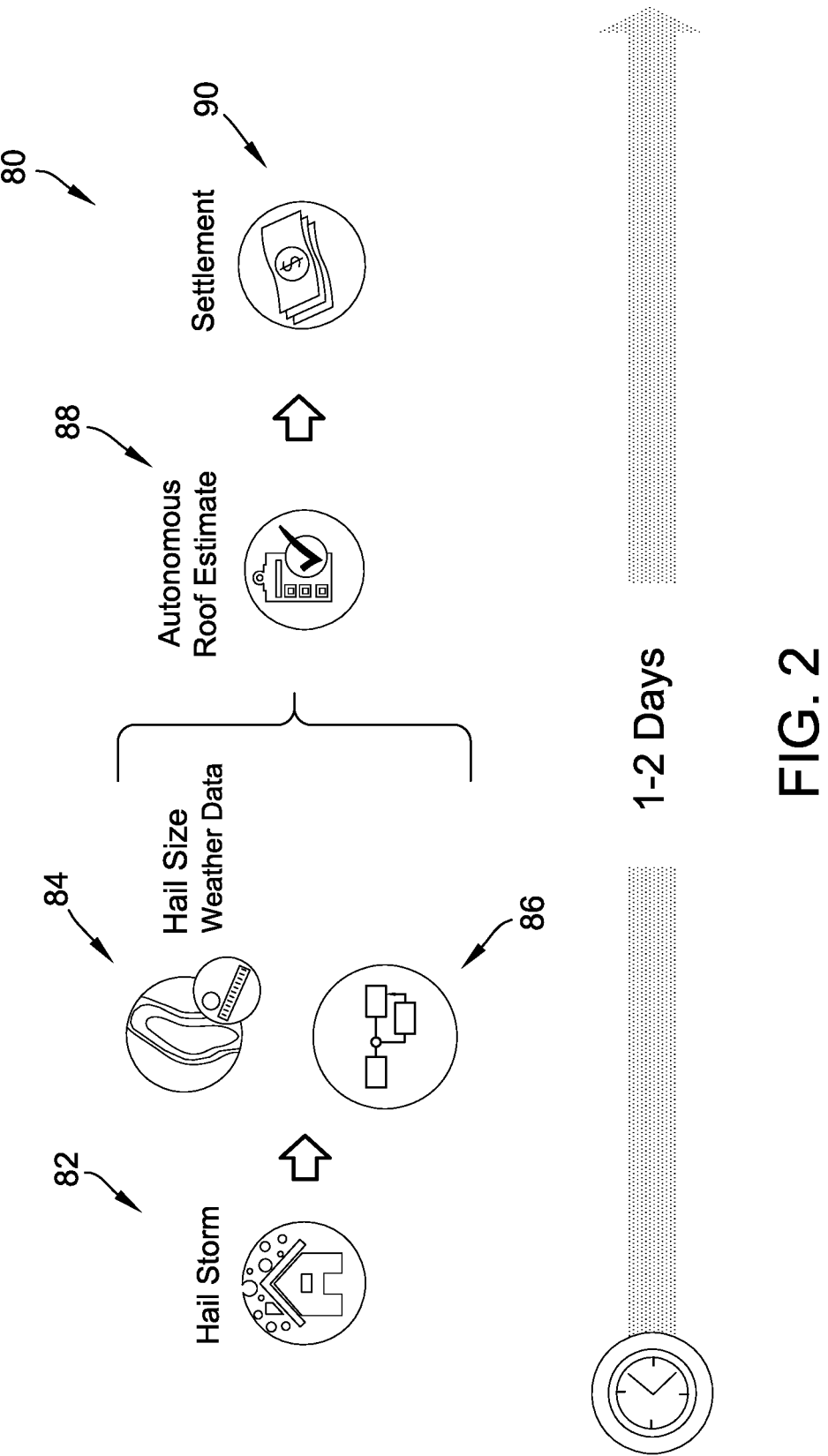
FIG. 2 illustrates a schematic of an exemplary process for determining property damage after a weather incident according to embodiments of systems and methods as described herein.
Figure 3:
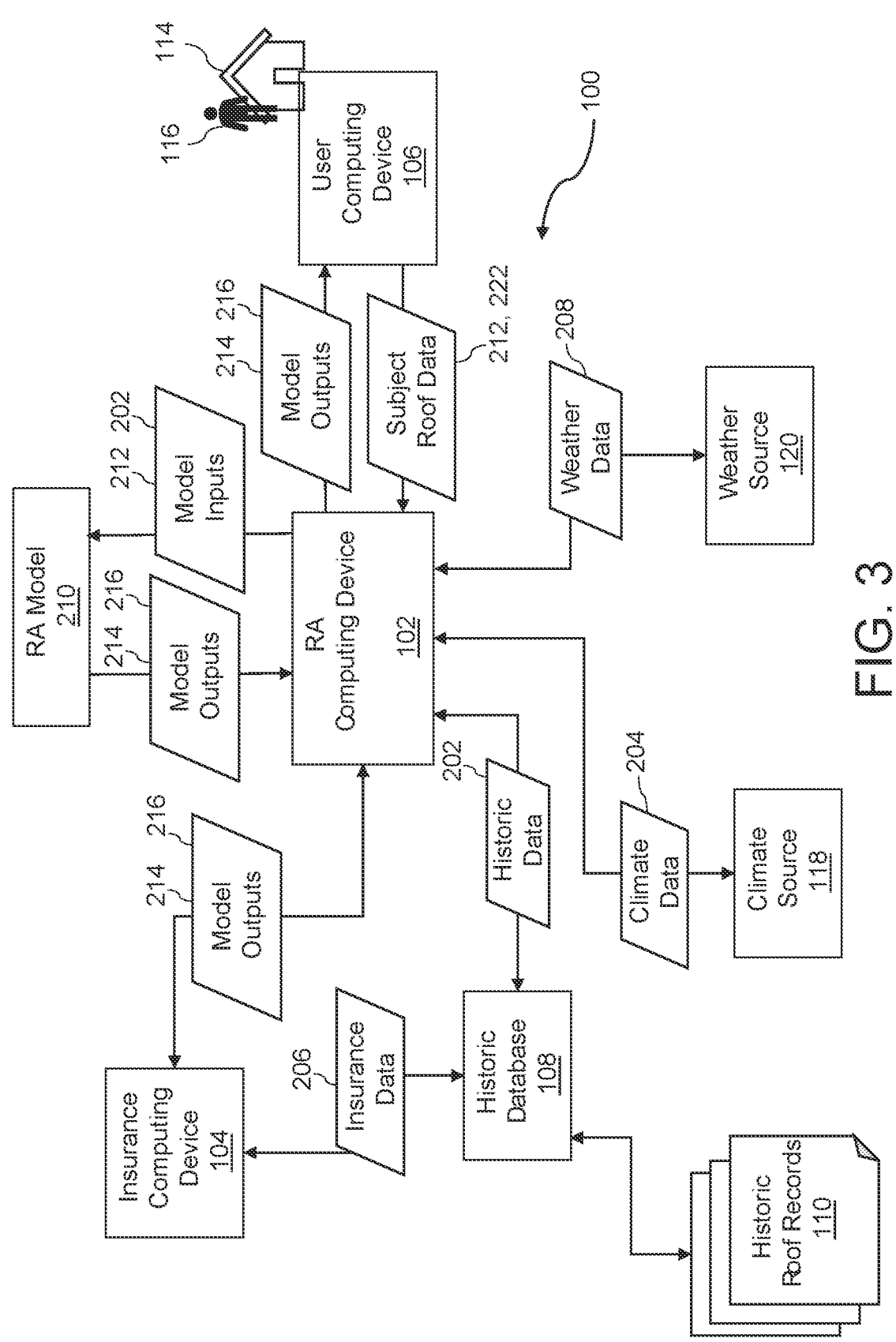
FIG. 3 illustrates a data flow diagram of an exemplary roof assessment process that may be implemented by the RA system described herein.

FIG. 2 depicts an expedited computer-implemented method 80 of processing a claim implemented by exemplary RA system 100, as described herein (see e.g., FIG. 3). Method 80 may include, after and/or during a weather incident 82, automatically receiving weather data 84 (e.g., via one or more APIs) and automatically retrieving property characteristics 86 associated with properties potentially affected by weather incident 82. For example, in method 80, the initiation of determining of a property status may be triggered automatically by one or more triggering events. Triggering events may include a weather incident, a weather incident satisfying a weather criterion, and/or a claim submission.

Notably, without requiring at least assigning 58 field representatives, scheduling 62 an in-person inspection, traveling to the property, performing an inspection 64, and providing a handwritten estimate 66 from method 50, method 80 may include providing a settlement 90 based upon an autonomous roof estimate 88 (e.g., based upon a property status, as generated by RA system 100, as described in further detail elsewhere herein).

Thus, method 80 may result in lower costs and decreased processing times compared to method 50. Claim processing of method 80 may be less than three days, within twentyfour hours, within two hours, or immediately after and/or during the weather incident. Further, method 80 may configured to be associated with parametric insurance and/or be enabled to notify policyholders with minimal delay and may be triggered by a weather incident, e.g., and not triggered, or delayed, by a person. The policyholder may be notified and/or prompted, e.g., by text messages, to initiate claim processing events, review determined damage, and/or accept issuance of settlement funds, (e.g., by a policyholder selecting a yes or a no response).

Accordingly, in at least some embodiments described herein, a claim may be processed and/or damages may be determined without in-person inspections, inspection scheduling, insurance adjustors, and/or roofing salesmen. In at least some embodiments described herein, a claim may be processed and/or a damage may be determined without delay (such as in automated manner, such as with parametric insurance) and with fewer mistakes, fewer workplace injuries, fewer inspections per day, lower operating costs, shorter deployments for insurance adjusters, better work/life balance for employees, and increased employee satisfaction.

FIG. 3 depicts an exemplary data flow diagram of a roof assessment process that may be used with RA system 100 (shown in FIG. 2). In other embodiments, the roof assessment process may include additional, fewer, or alternative steps, including those described elsewhere herein. System 100 may include a RA computing device 102, an insurance computing device 104, a user computing device 106, and a historic database 108. In other embodiments, system 100 may include additional, fewer, or alternative devices, including those described elsewhere herein. For example, in some embodiments, RA computing device 102 may include insurance computing device 104.

RA computing device 102 may be communicatively coupled to insurance computing device 104, user computing device 106, and/or historic database 108. RA computing device 102 may be configured to perform a roof assessment process for one or more properties 114, as described herein. Property 114 may include any type of roof for any type of structure, such as a residential building, a commercial building, and/or an industrial building.

RA computing device 102 may be communicatively coupled to a climate source 118 and/or a weather source 120. RA computing device 102 may receive and/or retrieve climate data 204 from climate source 118. The RA computing device 102 may retrieve and/or receive weather incident data 208 from weather source 120.

In some embodiments, RA computing device 102 may be configured to retrieve weather incident data 208 from a plurality of weather sources, e.g., commercial vendor weather service international and/or the National Weather Service, and then RA computing device 102 may store weather incident data 208 within historic database 108. In other embodiments, historic data 202 and/or historic roof records 110 may be received from a different computing device (not shown).

In some embodiments, RA computing device 102 may be configured to retrieve climate data 204 from a plurality of climate sources 118 and then RA computing device 102 may store climate data 204 within historic database 108. For example, and without limitation, RA computing device 102 may retrieve climate data 204 from the International Energy Conservation Code (IECC) and/or the Department of Energy's Building America (BA) Program. In other embodiments, historic data 202 and/or historic roof records 110 may be received from a different computing device (not shown).

Insurance computing device 104 may be associated with an insurance provider and/or another party responsible for insurance policy underwriting. Insurance computing device 104 may be associated with an insurance provider associated with an insurance policy for property 114. In certain embodiments, system 100 may include a plurality of insurance computing devices 104 that are communicatively coupled to RA computing device 102 and are associated with a plurality of insurance providers. Insurance computing device 104 may be in communication with RA computing device 104 to transmit and/or receive data associated with insurance claims.

User computing device 106 may be associated with a user or a group of users. User computing device 106 may be associated with an insurance policyholder 116. Policyholder 116 may be identified as an insured by the insurance policy for property 114. In other embodiments, user computing device 106 may be associated with a different user, such as, but not limited to, a building owner and/or an occupant (e.g., a renter or a leasee).

User computing device 106 may be in communication with RA computing device 102 to provide data to RA computing device 102 for the roof assessment process and/or to provide policyholder 116 with information from RA computing device 102. In some embodiments, user computing device 106 may be in communication with insurance computing device 104 to facilitate enrollment in an insurance policy and/or filing an insurance claim.

RA computing device 102 may be configured to retrieve historic data 202 to store within the historic database 108. In some embodiments, RA computing device 102 may compile retrieved historic data 202 to build a historic roof record 110 and then RA computing device 102 may subsequently store roof record 110 within historic database 108 for later use. Historic data 202 may include historic weather incident data 208, historic property status data, climate locality data 204, and/or historic insurance claim data 206.

Historic data 202 may be categorized into two general categories, including specific roof data associated with a singular roof and general roof data associated with a plurality of similar roofs. Similar roofs may include roofs that experienced the same or similar weather incident, having similar property statuses, that were located in the same climate locality and/or have the same and/or similar structural data. General data for similar roofs may be an average or a total of historic data 202 for all of the similar roofs. For example, general data may include policy exposures, policy rates, average costs, average claim counts, and/or average lifespan. Specific roof data may include a cost and/or a severity level associated with a historic insurance claim that is associated with a historic roof status for a specific roof.

RA computing device 102 may retrieve historic data 202 from a plurality of sources. For example, RA computing device 102 may retrieve historic data 202 from insurance computing device 104, weather source 120, and/or climate source 118.

RA computing device 102 may retrieve a plurality of historic roof records 110 from historic database 108 to build a training dataset. The training data set may be used to train a model 210. Model 210 may be a statistical model that may be used to determine a property status. Model 210 may be generated and/or trained using the training dataset using any suitable analysis and/or statistical technique. In some embodiments, model 210 may include a plurality of model parameters for comparing individual parameters to determined parameters, as described herein. In other embodiments, model 210 may be in a different format, such as a function or a set of functions.

In some embodiments, RA computing device 102 may retrieve a subset of historic roof records 110 from historic database 108. The subset may include a plurality of historic roof records 110 having the same or similar weather incident, having the same roof structural data, and/or having the same climate locality. The subsets of historic roof records 110 may be used to build training datasets for a particular weather incident, a specific climate locality, and/or a specific roof structural type.

In some embodiments, RA computing device 102 may generate a plurality of individual models 210 each associated with a specific weather incident, referred to as weather incident models. Each individual model may be trained, separately, using the subset of historic roof records 110 all having the same weather incident, e.g., the same weather signature. Alternatively, RA computing device 102 may generate a single model 210, referred to as a global model, that may be used to determine a roof status.

As each weather model may be trained using only a subset of the historic roof records 110, each having the same historic weather incident, the weather model may be trained using a smaller, more focused, training dataset, as compared to a training dataset including all of the historic roof records 110, such that the weather model may be trained with a reduced computational load. Further, weather models trained using a subset of historic roof records 110 may result in weather models that are more accurate for evaluating roofs experiences a type of weather incident associated with the weather model. In addition, having a reduced and more focused training dataset that decreases computational load will have improved model training time allowing the weather models to be more quickly updated as new historic roof records 110 are created and added to the subset training dataset.

RA computing device 102 may be communicatively coupled to user computing device 106 of a policyholder 116. Policyholder 116 may be associated with, e.g., the owner of, property 114. RA computing device 102 may receive subject roof data 212, associated with property 114, from user computing device 106. In some embodiments, subject roof data 212 may be received from insurance computing device 104. Subject roof data 212 includes information regarding property 114, for example, a climate locality of property 114 and/or roof structural data of property 114. In other embodiments, subject roof data 212 may include any data associated with property 114 that enables system 100 to function as described herein.

In some embodiments, RA computing device 102 may transmit a prompt to user computing device 106 for display to policyholder 116. Policyholder 116 may provide user input 222 including subject roof data 212, in response to the prompt. User input 222 may include, but is not limited to, text data, image data, video data, and/or audio data. In one example, policyholder 116 may capture image data of property 114 with user computing device 106. RA computing device 102 may be configured to receive the image data and perform image analysis on the image data to extract subject roof data 212, such as roof pitch of property 114, a slant and/or angle of property 114, visible damage to property 114, location of property 114, and/or the like. In another example, user computing device 106 may display one or more questions to policyholder 116. Policyholder 116 may then provide user input 222 in response to the questions.

RA computing device 102 may apply subject roof data 212 to trained model 210 in order to determine one or more model outputs. The model outputs may include one or more of a property status 214 of the subject property 114. Property status 214 may include a cost, a description, a designation, a confidence score, and/or a severity level. For example, property statuses 214 may include a description indicating that the roof requires repair and/or replacement of at least a portion, e.g., one or more shingles of property 114, at least partially caused by the weather incident. The description may include a type of shingle failure, such as broken, lifted, splitting, shrinkage, curling, or granule loss. Additionally, the status may include a failure status indicating that the entire roof needs to be replaced and/or repaired. In some cases, property status 214 may include a non-damage status indicating that the roof does not require repair and/or replacement as a result of the weather incident.

Property status 214 may include a severity level, e.g., severe damage or minimal damage. The severity level of the damage status may be associated with a cost to repair or replace the roof from damage at least partially caused by the weather incident. For example, severe damage may be associated with a higher cost to repair or replace severe damage as compared to a cost to repair or replace minimal damage. The severity level may also include a repair time associated with a time to repair and/or replace the roof. The severity level may include a range, e.g., high, medium, and low severity level, etc. where each of the levels includes a range of costs and/or repair times.

At least one of RA computing device 102 and/or model 210 may determine one or more recommendations 216 based upon, at least in part, determined property status 214 (e.g., a roof status). For example, in some embodiments, the model output may include recommendation 216. Recommendation 216 may include one or more recommended courses of actions related to the determined property status 214 (e.g., totally replace the roof, partially replace the roof, etc.). Recommendation 216 may include a recommendation to perform an in-person inspection or a recommendation not to perform an in-person inspection. RA computing device 102 may transmit model outputs, including one or more determined property statuses 214 and/or recommendation 216 to user computing device 106 and/or insurance computing device 104.

In the illustrated embodiment, the system 100 may update the training dataset by creating one or more new historic roof records 110. In particular, RA computing device 102 may generate new historic roof records 110 in response to an actual roof status, and then RA computing device 102 may add the newly generated historic roof records 110 to the training dataset to generate an updated training dataset. Subsequently, RA computing device 102 may re-train model 210 using the updated training dataset, further improving the accuracy of model 210. In some embodiments, RA computing device 102 may transmit and/or receive one or more messages from insurance computing device 104 and/or user computing device 106, the messages indicating that an actual property status. In some embodiments, insurance computing device 104 may determine one or more insurance quotes based upon property status 214 and/or recommendation data 216. Insurance computing device 104 may transmit insurance quotes to user computing device 106 and/or to RA computing device 102.

Exemplary User Computing Device

Figure 4:
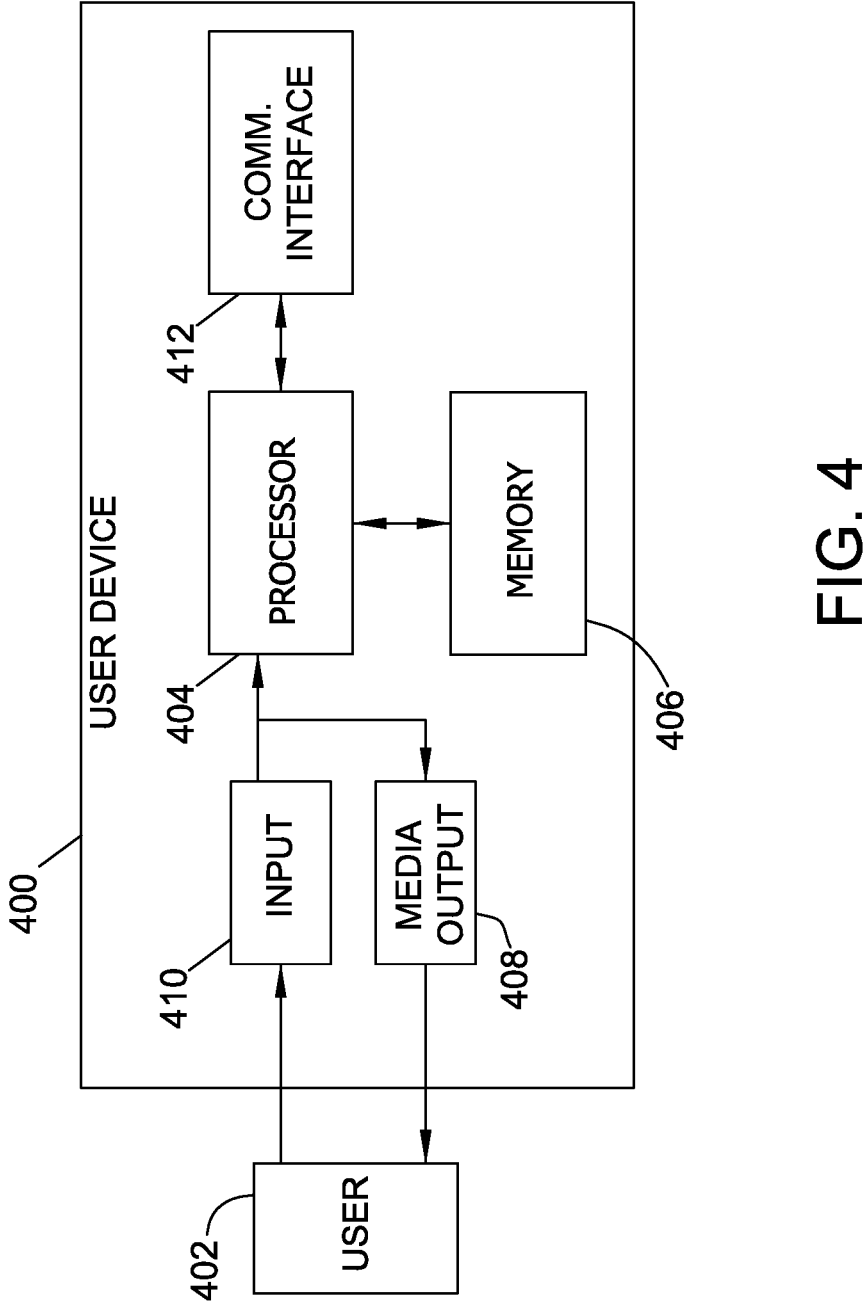
FIG. 4 illustrates an exemplary configuration of a user computer device, in accordance with one embodiment of the present disclosure.

FIG. 4 depicts an exemplary configuration of a user computing device 400, in accordance with one embodiment of the present disclosure. User computing device 400 may be operated by a user 402, such as policyholder 116. User computing device 400 may include, but is not limited to, RA computing device 102, insurance computing device 104, and/or user computing device 106 (all shown in FIG. 3). Additionally or alternatively, user computing device 400 may be, for example, a mobile device, smart home controller, smart vehicle, smart watch, smart contact lenses, augmented reality glasses, virtual reality headset, mixed or extended reality headset or glasses, wearables, voice or chat bot, ChatGPT bot or computing device, UAV (unmanned aerial device) or drone, other input device, and/or other electronic or electrical devices.

User computing device 400 may include a processor 404 for executing instructions. In some embodiments, executable instructions may be stored in a memory 406. Processor 404 may include one or more processing units (e.g., in a multi-core configuration). Memory 406 may be any device allowing information such as executable instructions and/or transaction data to be stored and retrieved. Memory 406 may include one or more computer readable media.

User computing device 400 may also include at least one media output component 408 for presenting information to user 402. Media output component 408 may be any component capable of conveying information to user 402. In some embodiments, media output component 408 may include an output adapter (not shown) such as a video adapter and/or an audio adapter. An output adapter may be operatively coupled to processor 404 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 408 may be configured to present a graphical user interface (e.g., a web browser and/or a client application) to user 402. A graphical user interface may include, for example, an interface for viewing prompts and data. In some embodiments, user computing device 400 may include an input device 410 for receiving input from user 402. User 402 may use input device 410 to, without limitation, provide user input.

Input device 410 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 408 and input device 410.

User computing device 400 may also include a communication interface 412, communicatively coupled to a remote device such as RA computing device 102 (shown in FIG. 3). Communication interface 412 may include, for example, a wired or wireless network adapter and/or a wireless data transceiver for use with a mobile telecommunications network.

Stored in memory 406 are, for example, computer readable instructions for providing a user interface to user 402 via media output component 480 and, optionally, receiving and processing input from input device 410. A user interface may include, among other possibilities, a web browser and/or a client application. Web browsers enable users, such as user 402, to display and interact with media and other information typically embedded on a web page or a website from RA computing device 102 and/or insurance computing device 104. A client application may allow user 402 to interact with, for example, RA computing device 102. For example, instructions may be stored by a cloud service, and the output of the execution of the instructions may be sent to the media output component 408.

Exemplary Host Computing Device

Figure 5:
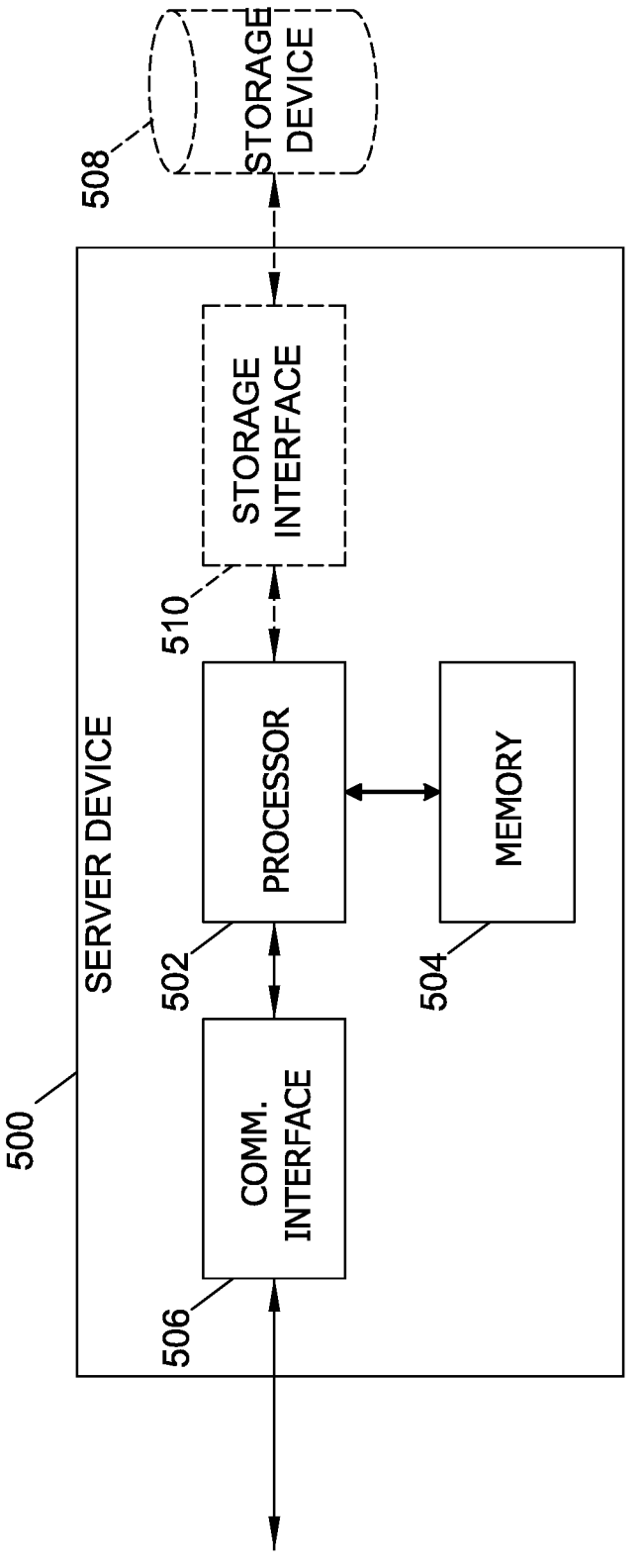
FIG. 5 illustrates an exemplary configuration of a host computing device, in accordance with one embodiment of the present disclosure.

FIG. 5 depicts an exemplary configuration of a host computing system, in accordance with one embodiment of the present disclosure. Host computing device 500 may include, but is not limited to, RA computing device 102, insurance computing device 104 (both shown in FIG. 3), and/or the other electrical or electronic devices mentioned elsewhere herein, and may be configured to employ the parametric insurance functionality discussed herein, such as collecting sensor and other data, and issuing insurance payments after processor analysis or machine learning analysis of the sensor and other data. Host computing device 500 may also include a processor 502 for executing instructions. Instructions may be stored in a memory area 504. Processor 502 may include one or more processing units (e.g., in a multi-core configuration).

Processor 502 may be operatively coupled to a communication interface 506 such that host computing device 500 is capable of communicating with a remote device, such as another host computing device 500 and/or user computing device 400, for example, using wireless communication or data transmission over one or more radio links or digital communication channels. For example, communication interface 506 may receive data, e.g., climate data 204, roof records 110, etc.

Processor 502 may also be operatively coupled to a storage device 508. Storage device 508 may be any computer-operated hardware suitable for storing and/or retrieving data, such as, but not limited to, data associated with historic databases 108 and/or climate source 118 (shown in FIG. 3). In some embodiments, storage device 508 may be integrated in host computing device 500. For example, host computing device 500 may include one or more hard disk drives as storage device 508.

In other embodiments, storage device 508 may be external to host computing device 500 and may be accessed by a plurality of host computing devices 500. For example, storage device 508 may include a storage area network (SAN), a network attached storage (NAS) system, and/or multiple storage units such as hard disks and/or solid-state disks in a redundant array of inexpensive disks (RAID) configuration.

In some embodiments, processor 502 may be operatively coupled to storage device 508 via a storage interface 510. Storage interface 510 may be any component capable of providing processor 502 with access to storage device 508. Storage interface 510 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 502 with access to storage device 508.

Processor 502 may execute computer-executable instructions for implementing aspects of the disclosure. In some embodiments, the processor 502 may be transformed into a special purpose microprocessor by executing computer-executable instructions or by otherwise being programmed.

Exemplary Computer-Implemented Methods

Figure 6:
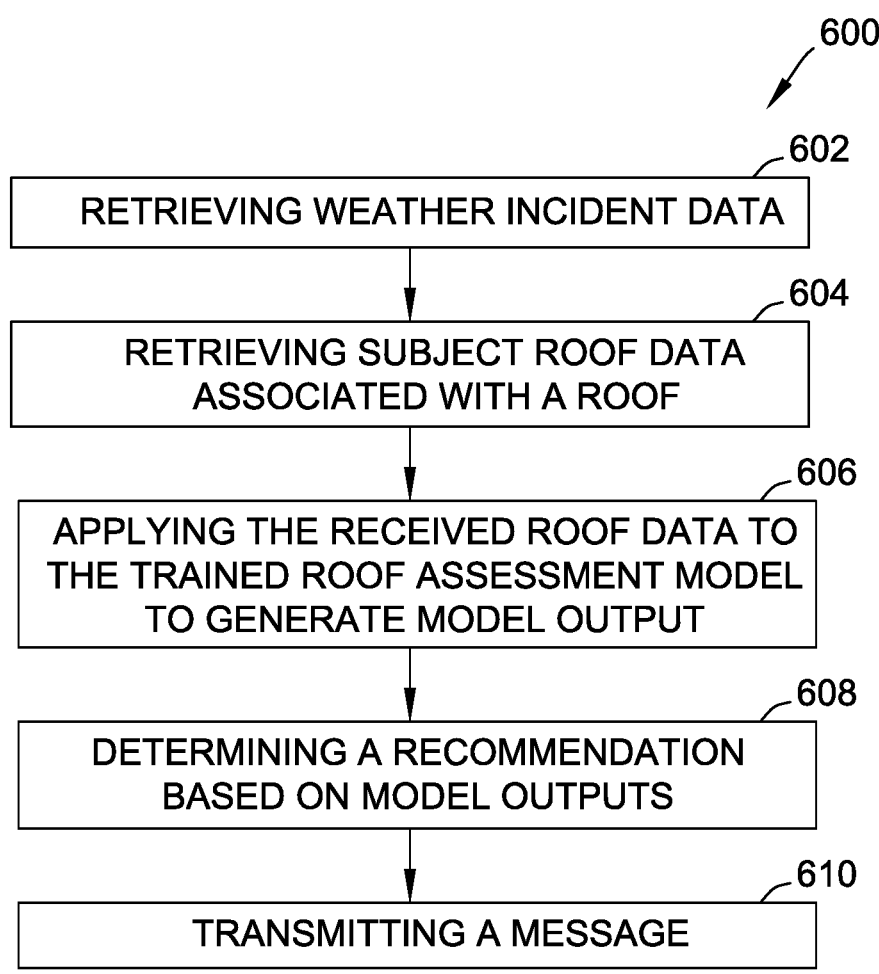
FIG. 6 illustrates a flow diagram of an exemplary computer-implemented method for determining a roof status that may be implemented by the RA system described herein.

FIG. 6 depicts an exemplary computer-implemented method 600 for determining a roof status based upon a weather incident that may be used with RA system 100 (shown in FIG. 3). Method 600 may be at least partially performed by RA computing device 102 (shown in FIG. 3). In certain embodiments, method 600 may be at least partially performed by another computing device, such as insurance computing device 104 (shown in FIG. 3). In other embodiments, method 600 may include additional, fewer, or alternative steps, including those described elsewhere herein. For instance, method 600 may include one or more of the parametric insurance-related actions or functionality discussed herein.

With respect to FIG. 6, method 600 may include RA computing device 102 receiving 602, alternatively and/or additionally requesting or retrieving, weather incident data (e.g., weather incident data 208). In some cases, one or more triggering events (or parametric insurance-related triggers or triggering events) may initiate, e.g., automatically cause, RA computing device 102 to receive 602 weather incident data 208. In some embodiments, the weather incident data may be received at RA computing device 102 from one or more application programming interfaces (APIs).

A parametric trigger or triggering event may include weather incident data 208 satisfying a weather criterion. An example of a weather incident satisfying a weather criterion may include a hail size of a weather incident, e.g., hail weight or volume, exceeding a predetermined threshold hail size. In another example, a weather criterion may include the weather incident having a weather signature that matches a predetermined weather signature.

A parametric trigger or triggering event may also include submission of a claim, e.g., by a policyholder. The submitted claim may include the location (e.g., GPS coordinates, climate locality, etc.) of the insured property identified in the claim that is affected by the weather incident. RA computing device 102 may use the location to retrieve 602 weather incident data 208 for a weather incident occurring at that location. RA computing device 102 may receive 602 weather incident data 208 by submitting a request to one or more of the available weather sources. In some embodiments, the claim submission may include a date/time of a weather incident that may be used by RA computing device 102 to receive 602 weather incident data 208.

In yet another additional, and/or alternative, example a parametric trigger or triggering event may include submission of one or more claims by one or more secondary policyholders having insured properties located in proximity, e.g., within five miles, or within ten miles, to the policyholder. In some cases, a weather incident may affect a plurality of policyholders in a region in which the weather incident occurred. In some cases, one or more policyholders having insured properties in proximity to each other may submit claims. Accordingly, the submission of one or more claims in a geographic region affected by the weather incident may be a triggering event (or parametric trigger) to retrieve weather incident data 208 for a geographic location of a policyholder(s), within or near the geographic region, who have not yet submitted a claim. Receiving 602 weather incident data 208 may be triggered by additional, and/or alternative, triggering events that automatically cause RA computing device 102 to retrieve weather incident data 208.

Method 600 may include retrieving 604, alternatively and/or additionally requesting or receiving, subject roof data 212. In some embodiments, subject roof data 212 may be included in a claim. Alternatively, and/or additionally, subject roof data 212 may be retrieved 604 from computing devices, such as insurance computing device 104 and/or user computing device 106. In some embodiments, method 600 may include retrieving 604 subject roof data 212 from memory 504, storage device 508 and/or a database storing policyholder information.

In some embodiments, one or more triggering events may initiate, e.g., automatically cause, RA computing device 102 to retrieve 602 subject roof data 212. A triggering event may include one or more of the following: RA computing device

102 receiving 602 weather incident data 208, a weather incident satisfying a weather criterion (such as satisfying a parametric weather trigger or weather triggering event), and/or a claim submission. Additional, and/or alternative, triggering events may automatically cause the RA computing device 102 to retrieve 604 subject roof data.

Method 600 may include RA computing device 102 applying 606 one or more model inputs to a trained RA model 210 to generate one or more RA model 210 outputs. Model inputs include the subject roof data and/or the weather incident data 208. The outputs may include one or more of a property status 214 associated with property damage of the subject roof resulting from the weather incident. The outputs may include a description of the property status 214 e.g., shingle damage, granule loss, etc., and/or a determined cost associated with the repair and/or replacement of the property damage, e.g., material costs and labor costs. The outputs may include a length of time to repair or replace the property damage, e.g., days, weeks and/or months. The outputs may also include indirect costs, for example, hotel costs for the policyholder to stay while the damage is repaired. In some cases, RA model 210 may output a confidence score associated with an accuracy of the determined property status and/or the determined cost. RA model 210 may also generate one or more other suitable outputs.

Method 600 may include determining 608 one or more recommendations based upon, at least in part, RA model 210 outputs. For example, RA computing device 102 may determine 608 one or more recommendations based upon, at least in part, the determined property status, the determined damage description, the determined costs, and/or the confidence score. For example, determining 608 a recommendation may include determining if a model output meets a recommendation criterion.

In a first example, determining 608 one or more recommendations may include RA computing device 102 determining if the determined cost satisfies the cost criterion (satisfying the cost criterion may act as another parametric trigger or triggering event that leads to additional functionality automatically being employed) and the RA computing device 102 may generate an inspection recommendation based upon the determination. A cost criterion (or parametric trigger) may include the determined cost exceeding a cost threshold. The cost threshold may include costs in excess of $50,000, in excess of $100,000.00, and/or in excess of $200,000, for example.

If RA computing device 102 determines that the determined cost exceeds the cost threshold, then RA computing device 102 may automatically determine a recommendation including recommending an in-person inspection. Likewise, if the RA computing device 102 determines that the determined cost does not exceed the cost threshold, then the RA computing device 102 may determine a recommendation including recommending that an in-person inspection is not necessary.

In another example, determining 608 one or more recommendations may include RA computing device 102 determining if the confidence score satisfies a score criterion (satisfying the score criterion may act as another parametric trigger or triggering event that leads to additional functionality automatically being employed). A score criterion may by a score threshold, such as 60%, 50%, and/or 40%, for example.

If RA computing device 102 determines that the confidence score does not exceed the score threshold, then RA computing device 102 may determine a recommendation including recommending an in-person inspection. Likewise, if RA computing device 102 determines that the confidence score exceeds the score threshold, then RA computing device 102 may determine a recommendation including recommending that an in-person inspection is not necessary.

In yet another example, RA computing device 102 may determine a repair recommendation regarding the repair and/or replacement of the damaged property, e.g., a recommended shingle type and/or a recommended shingle material that should be used for the repair and/or replacement of the damaged property. The repair recommendation may be automatically determined, for instance, if a cost or score criteria have been satisfied if they are being employed as parametric triggers or triggering events.

In another example, RA computing device 102 may determine a repair recommendation based upon a model output (e.g., an output received by RA computing device 102 from a trained roof assessment model may include a recommendation to, for example, replace at least a portion of a roof based upon a roof status).

Method 600 may include RA computing device 102 transmitting 610 one or more status messages to at least one of policyholder 116, e.g., to a user computing device 106, and/or an insurance provider associated with an insurance policy for property 114, e.g., to an insurance computing device 104. The status messages may include the one or more model outputs, such as the determined property status 214 and/or recommendation 216. Further, receipt of the message by, for example, user computing device 106, may cause a claim selector to be displayed at user computing device 106 wherein selection of the claim selector causes initiation of a claim associated with replacement of at least the portion of the roof.

Method 600 may include RA computing device 102 receiving an input from the user computing device associated with selection of the claim selector and transmitting a claim message to the user computing device that causes display of one or more data fields for entry of data associated with the claim.

Method 600 may include RA computing device 102, in response to selection of the claim selector, initiating the claim without requiring an in-person inspection of the roof.

Method 600 may also include one or more actions for generating, e.g., training and/or tuning, RA model 210. Method 600 may include retrieving historic roof records 110 from historic database 108. Method 600 may include RA computing device 102 retrieving historic roof data 202 from at least one of insurance computing device 104 and/or climate source 118. In some embodiments, method 600 may include RA computing device 102 generating historic roof records 110 by compiling retrieved historic roof data 202. In some embodiments, method 600 may include RA computing device 102 storing the generated historic roof records 110 within historic database 108.

Method 600 may include RA computing device 102 building a training dataset. The training dataset may include retrieving historic roof records 110 from the historic database 108 and/or retrieving a subset of the historic roof records 110 from the historic database 108. In some embodiments, method 600 may include RA computing device 102 building a climate specific training dataset, a roof age specific training dataset, and/or a weather signature specific training dataset, including RA computing device 102 retrieving a plurality of historic roof records 110, each having the same climate locality, the same roof age, and/or the same weather signature, respectively.

Method 600 may include RA computing device 102 training RA model 210 based using the training dataset. In certain embodiments, RA model 210 may include a plurality of model parameters. Method 600 may further include RA computing device 102 tuning the trained RA model 210 by iteratively evaluating the RA model 210 while adjusting weighting factors of the model parameters until the error in the model outputs meets an error criterion. RA computing device 102 may store RA model 210 for subsequent access during a roof assessment process for a roof.

In other words, method 600 may include RA computing device 102 training a trained roof assessment model using historic records including historic weather incident data and historic roof structural data, updating the historic records to updated historic records including a new historic record, the new historic record including the roof status of the roof, the weather incident data, and the roof data, and/or re-training the trained roof assessment model using the updated historic records.

Method 600 may include RA computing device 102 generating one or more new historic roof records 110, in response to RA computing device 102 determining the actual status of property. In some embodiments, method 600 may include RA computing device 102 comparing an actual roof status, e.g., the actual cost, to the determined property status, e.g., RA model 210 determined cost. If RA computing device 102 determines that the comparison satisfies a criterion (satisfying the criterion may act as another parametric trigger or triggering event that again leads to additional functionality automatically being employed), RA computing device 102 may generate a new historic roof record 110 including the RA model 210 determined cost.

Method 600 may further include adding new historic roof records to the training dataset to generate an updated training dataset. Method 600 may further include RA computing device 102 using the updated training dataset to re-train RA model 210 in order to generate a more accurate and/or a more up to date version of RA model 210.

FIG. 7 illustrates a flow diagram of an exemplary computer-implemented method 700 for updating a trained roof assessment model that may be implemented by RA system 100, as described herein.

With respect to FIG. 7, method 700 may include receiving 702 historic weather incident data (e.g., data 208) associated with prior weather events in geographic locations (e.g., via one or more APIs) and/or receiving 704 historic roof data including historic roof structural data (e.g., historic roof records 110) associated with roofs located in the geographic locations, as described herein. Method 700 may further include training 706 a roof assessment model (e.g., model 210) using the historic weather incident data and the historic roof structural data based upon the geographic locations and/or updating 708 the trained roof assessment model using updated historic weather incident data and historic roof structural data.

Method 700 may further include storing the updated roof assessment model within a memory, the updated roof assessment model being configured to generate an output for a selected roof by inputting current weather incident data and current roof structural data for the selected roof, and wherein the output includes a roof status of the selected roof and a recommendation to repair or replace at least a portion of the selected roof based upon the roof status.

Method 700 may further include inputting the current weather incident data to the updated roof assessment model and/or inputting the current roof structural data for the selected roof to the updated roof assessment model. Method 700 may further include receiving the output from the updated roof assessment model.

Method 700 may further include, based at least in part upon receiving the output from the updated roof assessment model, transmitting a message to a user computing device associated with the selected roof that causes display of a claim selector at the user computing device wherein selection of the claim selector causes initiation of a claim associated with replacement of at least the portion of the selected roof. Method 700 may further include receiving an input from the user computing device associated with selection of the claim selector and/or transmitting a claim message to the user computing device that causes display of one or more data fields for entry of data associated with the claim.

Figure 8:
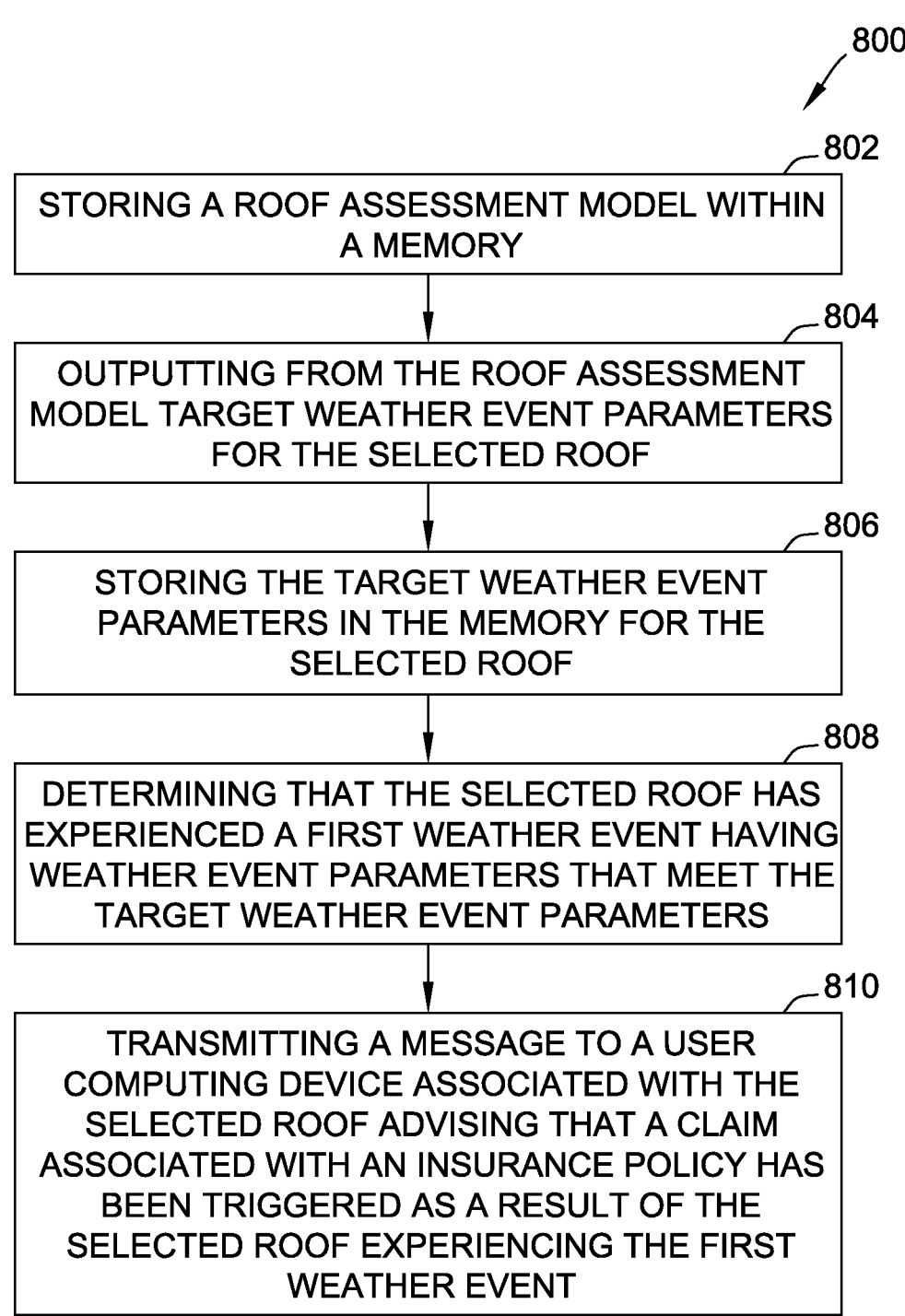
FIG. 8 illustrates a flow diagram of another exemplary computer-implemented method for determining a roof status that may be implemented by the RA system described herein.

FIG. 8 illustrates a flow diagram of another exemplary computer-implemented method 800 for determining a roof status that may be implemented by RA system 100, as described herein.

With respect to FIG. 8, method 800 may include storing 802 a roof assessment model (e.g., model 210) within a memory, the roof assessment model configured to determine a roof status of a selected roof after experiencing a weather event wherein the roof assessment model is trained using historic weather incident data and historic roof structural data (e.g., from historic database 108), outputting 804 from the roof assessment model target weather event parameters for the selected roof wherein the target weather event parameters are weather event parameters that result in at least repairable damage to the selected roof, and/or storing 806 the target weather event parameters in the memory for the selected roof.

Method 800 may further include determining 808 that the selected roof has experienced a first weather event having weather event parameters that meet the target weather event parameters and/or transmitting 810 a message to a user computing device associated with the selected roof advising that a claim associated with an insurance policy has been triggered as a result of the selected roof experiencing the first weather event.

In some embodiments, method 800 may also include receiving the weather event parameters via one or more application programming interfaces (APIs).

Method 800 may further include training the roof assessment model using the historic weather incident data and the historic roof structural data and/or re-training the roof assessment model using updated historic weather incident data and updated roof structural data.

Method 800 may also include receiving an input from the user computing device confirming that the claim associated with the insurance policy should be filed and/or causing the claim to be filed. Method 800 may further include receiving an input from the user computing device confirming that the claim associated with the insurance policy should be filed and/or transmitting at least one message to the user computing device that causes display of one or more data fields for entry of data associated with the claim at the user computing device.

Exemplary Computing Device

Figure 9:
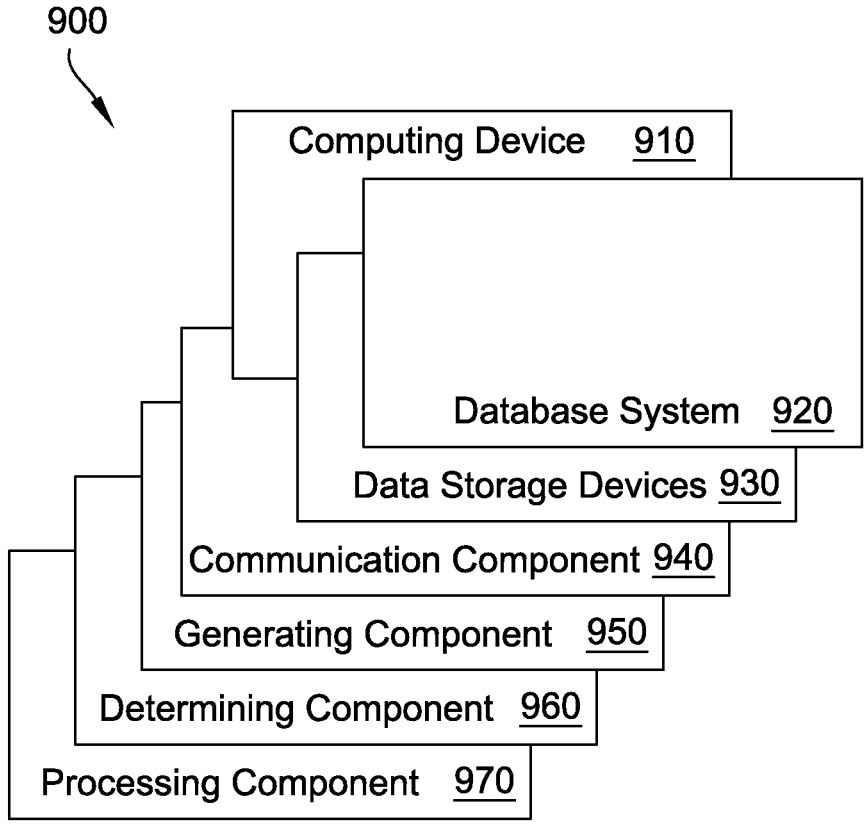
FIG. 9 illustrates a diagram of components of one or more exemplary computing devices that may be used in the RA system described herein.

FIG. 9 depicts a diagram 900 of components of one or more exemplary computing devices 910 that may be used in system 100, shown in FIG. 3. In some embodiments, computing device 910 may be similar to RA computing device 102 (shown in FIG. 3) and/or the other computing devices discussed elsewhere herein. Database system 920 may be coupled with several separate components within computing device 910, which perform specific tasks. Database system 920 may include a plurality of distributed databases that store specific types of data, such as historic database 108, and/or climate source 118 (shown in FIG. 3). In this embodiment, database 920 system may include historic roof data 202, climate data 204, and/or historic roof records 110.

Computing device 910 may include database system 920, as well as data storage devices 930. Computing device 910 may also include a communication component 940 for receiving 602 and/or retrieving roof data 202 and/or historic roof records 110 (shown in FIG. 3). Computing device 910 may further include a generating component 950 for generating, e.g., training RA model 210 for the retrieved data (shown in FIG. 3). Computing device 910 further includes a determining component 960 for determining a recommendation for the roof. A processing component 970 may assist with execution of computer-executable instructions associated with the system.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), voice or chat bots, ChatGPT bots, augmented reality glasses, virtual reality headsets, mixed or extended reality headsets or glasses, mobile devices, smart watches, wearables, smart contact lenses, other computing input devices, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and may be followed with reinforcement or reinforced learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data (e.g., training based upon updated datasets indicating, for example, whether properties predictively identified by RA system 100 as including roofs that would be replaced if a certain size hail stone impacted them actually required replacement in the next hailstorm including hail stones of that certain size). Models may be created based upon example inputs in order to make valid and reliable predictions for novel inputs.

Additionally, or alternatively, the machine learning programs may be trained by inputting sample data sets or certain data into the programs, such as image, mobile device, vehicle telematics, autonomous vehicle, and/or intelligent home telematics data. The machine learning programs may utilize deep learning algorithms that may be primarily focused on pattern recognition and may be trained after processing multiple examples. The machine learning programs may include Bayesian program learning (BPL), voice recognition and synthesis, image or object recognition, optical character recognition, and/or natural language processing-either individually or in combination. The machine learning programs may also include natural language processing, semantic analysis, automatic reasoning, and/or machine learning.

In supervised machine learning, a processing element may be provided with example inputs and their associated outputs and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

In some embodiments, at least part of RA system 100 may be implemented in a cloud computing service and/or utilize certain tools or other evolving technologies (e.g., blockchain, artificial intelligence (AI), Computer Vision, Quick-Sight, SageMaker, Athena).

Exemplary Parametric Embodiments

The present embodiments may relate to parametric insurance, such as parametric homeowners insurance, or roof-based parametric endorsements to a homeowners policy. For instance, based upon processor analysis of weather data and/or aerial images, if a parametric trigger event or triggering threshold has been satisfied (such as a processor determination that a hailstorm of sufficient size hail that lasted for a sufficient duration likely hit a neighborhood or individual home), an automatic payout to an insured will be issued or otherwise sent.

In one aspect, a roof assessment (RA) computing device may include at least one memory and at least one processor in communication with the at least one memory may be provided. The at least one processor may be programmed to receive (e.g., via one or more application programming interfaces (APIs)) weather incident data (e.g., hail size, duration of weather incident, weather incident severity, weather signature, wind speed, wind direction, and/or temperature) associated with a weather event in a geographic location and/or retrieve roof data (e.g., including climate data including a temperature zone, a moisture regime, above a warm-humid line, and/or below a warm-humid line) including roof structural data (e.g., roof age, shingle type, roof pitch (e.g., roof angle), age of roof, total area of the roof, and/or roof occlusion) associated with a roof in the geographic location. The roof may be associated with a policy stored in the at least one memory.

The at least one processor may also be programmed to, based upon the roof being associated with the policy, apply the roof data and the weather incident data to a trained roof assessment model configured to determine a roof status of the roof. The trained roof assessment model may be trained using historic weather incident data and historic roof structural data. The at least one processor may be further programmed to receive an output from the trained roof assessment model. The output may include a recommendation to replace at least a portion of the roof based upon the roof status and, based upon the recommendation, transmit a message to a user computing device associated with the policy that causes display of a claim selector at the user computing device. Selection of the claim selector may cause initiation of a claim associated with replacement of at least the portion of the roof.

In some aspects, the RA computing device may be programmed to train the roof assessment model using historic records (including the historic weather incident data and historic roof structural data), update the historic records to updated historic records including a new historic record (the new historic record including the roof status of the roof, the weather incident data, and the roof data), and/or re-train the trained roof assessment model using the updated historic records.

In some aspects, the RA computing device may be programmed to receive an input from the user computing device associated with selection of the claim selector and/or transmit a claim message to the user computing device that causes display of one or more data fields for entry of data associated with the claim.

In some aspects, the roof data may be retrieved in response to a triggering event (or parametric trigger or event) wherein the triggering event includes at least one of: (i) a policyholder submitting a policy claim, (ii) the weather event satisfying a weather criterion, and/or (iii) a secondary policyholder submitting a policy claim wherein the secondary policyholder is associated with a property having a location near the roof.

In some aspects, the at least one processor may be further configured to, in response to selection of the claim selector, initiate and/or complete (e.g., provide payment to policyholder and/or close) the claim without requiring an in-person inspection of the roof.

In some aspects, at least one non-transitory computer-readable storage medium media having computer-executable instructions embodied thereon is described. The instructions, when executed by at least one processor, may cause the at least one processor to: (i) receive weather incident data associated with a weather event in a geographic location; (ii) retrieve roof data including roof structural data associated with a roof in the geographic location, wherein the roof is associated with a policy stored in the at least one non-transitory computer-readable storage media; based upon the roof being associated with the policy, (iii) apply the roof data and the weather incident data to a trained roof assessment model configured to determine a roof status of the roof, wherein the trained roof assessment model is trained using historic weather incident data and historic roof structural data; (iv) receive an output from the trained roof assessment model, wherein the output includes a recommendation to replace at least a portion of the roof based upon the roof status; and/or (v) based upon the recommendation, transmit a message to a user computing device associated with the policy that causes display of a claim selector at the user computing device, wherein selection of the claim selector causes initiation of a claim associated with replacement of at least the portion of the roof.

In some aspects, the instructions may further cause the processor to receive the weather incident data via one or more application programming interfaces (APIs). In some aspects, the instructions may further cause the processor to train the roof assessment model using historic records including the historic weather incident data and historic roof structural data, update the historic records to updated historic records including a new historic record, the new historic record including the roof status of the roof, the weather incident data, and the roof data, and/or re-train the trained roof assessment model using the updated historic records.

In some aspects, the instructions may further cause the processor to receive an input from the user computing device associated with selection of the claim selector and/or transmit a claim message to the user computing device that causes display of one or more data fields for entry of data associated with the claim.

In some aspects, the instructions may further cause the processor to retrieve the roof data in response to a triggering event, wherein the triggering event includes at least one of: i) a policyholder submitting a policy claim, ii) the weather event satisfying a weather criterion, or iii) a secondary policyholder submitting a policy claim, wherein the secondary policyholder is associated with a property having a location near the roof.

In some aspects, the instructions may further cause the processor to in response to selection of the claim selector, initiate the claim without requiring an in-person inspection of the roof. In some aspects, the weather incident data includes at least one of: hail size, duration of weather incident, weather incident severity, weather signature, wind speed, wind direction, or temperature, the roof structural data includes at least one of: roof age, shingle type, roof pitch, age of roof, total area of the roof, or roof occlusion, and/or the roof data includes climate data, and wherein the climate data includes at least one of: a temperature zone, a moisture regime, above a warm-humid line, or below a warm-humid line.

In some aspects, a computer-based method implemented by at least one processor in communication with at least one memory may be provided. The computer-based method may include: (i) receiving weather incident data associated with a weather event in a geographic location; (ii) retrieving roof data including roof structural data associated with a roof in the geographic location, wherein the roof is associated with a policy stored in at least one memory; based upon the roof being associated with the policy, (iii) applying the roof data and the weather incident data to a trained roof assessment model configured to determine a roof status of the roof, wherein the trained roof assessment model is trained using historic weather incident data and historic roof structural data; (iv) receiving an output from the trained roof assessment model, wherein the output includes a recommendation to replace at least a portion of the roof based upon the roof status; and/or (v) based upon the recommendation, transmitting a message to a user computing device associated with the policy that causes display of a claim selector at the user computing device, wherein selection of the claim selector causes initiation of a claim associated with replacement of at least the portion of the roof.

In some aspects, the computer-based method may include receiving the weather incident data via one or more application programming interfaces (APIs). In some aspects, computer-based method may include training the trained roof assessment model using historic records including the historic weather incident data and historic roof structural data, updating the historic records to updated historic records including a new historic record, the new historic record including the roof status of the roof, the weather incident data, and the roof data, and/or re-training the trained roof assessment model using the updated historic records.

In some aspects, the computer-based method may include receiving an input from the user computing device associated with selection of the claim selector and/or transmitting a claim message to the user computing device that causes display of one or more data fields for entry of data associated with the claim.

In some aspects, the roof data is retrieved in response to a triggering event, wherein the triggering event includes at least one of: i) a policyholder submitting a policy claim, ii) the weather event satisfying a weather criterion, or iii) a secondary policyholder submitting a policy claim, wherein the secondary policyholder is associated with a property having a location near the roof. In some aspects, the computer-based method may include, in response to selection of the claim selector, initiating the claim without requiring an in-person inspection of the roof.

In some aspects, a roof assessment (RA) computing device including at least one memory and at least one processor in communication with the at least one memory may be provided. The at least one processor may be programmed to: (i) receive historic weather incident data associated with prior weather events in geographic locations; (ii) receive historic roof data including historic roof structural data associated with roofs located in the geographic locations; (iii) train a roof assessment model using the historic weather incident data and the historic roof structural data based upon the geographic locations; (iv) update the trained roof assessment model using updated historic weather incident data and updated historic roof structural data; and/or (v) store the updated roof assessment model within the at least one memory, the updated roof assessment model being configured to generate an output for a selected roof by inputting current weather incident data and current roof structural data for the selected roof, and wherein the output includes a roof status of the selected roof and a recommendation to repair or replace at least a portion of the selected roof based upon the roof status.

In some aspects, the at least one processor may be programmed to receive the current weather incident data via one or more application programming interfaces (APIs).

In some aspects, the at least one processor may be programmed to input the current weather incident data to the updated roof assessment model and/or input the current roof structural data for the selected roof to the updated roof assessment model. In some aspects, the at least one processor may be programmed to receive the output from the updated roof assessment model. In some aspects, the at least one processor may be programmed to, based at least in part upon receiving the output from the updated roof assessment model, transmit a message to a user computing device associated with the selected roof that causes display of a claim selector at the user computing device, wherein selection of the claim selector causes initiation of a claim associated with replacement of at least the portion of the selected roof. In some aspects, the at least one processor may be programmed to receive an input from the user computing device associated with selection of the claim selector. In some aspects, the at least one processor may be programmed to transmit a claim message to the user computing device that causes display of one or more data fields for entry of data associated with the claim.

In some aspects, at least one non-transitory computer-readable storage media having computer-executable instructions embodied thereon may be provided. The instructions, wherein when executed by at least one processor, may cause the at least one processor to: (i) receive historic weather incident data associated with prior weather events in geographic locations; (ii) receive historic roof data including historic roof structural data associated with roofs located in the geographic locations; (iii) train a roof assessment model using the historic weather incident data and the historic roof structural data based upon the geographic locations; (iv) update the trained roof assessment model using updated historic weather incident data and historic roof structural data; and/or (v) store the updated roof assessment model in memory, the updated roof assessment model being configured to generate an output for a selected roof by inputting current weather incident data and current roof structural data for the selected roof, and wherein the output includes a roof status of the selected roof and a recommendation to repair or replace at least a portion of the selected roof based upon the roof status.

In some aspects, the instructions may cause the at least one processor to receive the current weather incident data via one or more application programming interfaces (APIs).

In some aspects, the instructions may cause the at least one processor to input the current weather incident data to the updated roof assessment model and/or input the current roof structural data for the selected roof to the updated roof assessment model. In some aspects, the instructions may cause the at least one processor to receive the output from the updated roof assessment model. In some aspects, the instructions may cause the at least one processor to, based at least in part upon receiving the output from the updated roof assessment model, transmit a message to a user computing device associated with the selected roof that causes display of a claim selector at the user computing device, wherein selection of the claim selector causes initiation of a claim associated with replacement of at least the portion of the selected roof. In some aspects, the instructions may cause the at least one processor to receive an input from the user computing device associated with selection of the claim selector. In some aspects, the instructions may cause the at least one processor to transmit a claim message to the user computing device that causes display of one or more data fields for entry of data associated with the claim.

In some aspects, a computer-based method implemented by at least one processor in communication with at least one memory may be provided. The computer-based method may include: (i) receiving historic weather incident data associated with prior weather events in geographic locations; (ii) receiving historic roof data including historic roof structural data associated with roofs located in the geographic locations; (iii) training a roof assessment model using the historic weather incident data and the historic roof structural data based upon the geographic locations; (iv) updating the trained roof assessment model using updated historic weather incident data and historic roof structural data; and/or (v) storing the updated roof assessment model within a memory, the updated roof assessment model being configured to generate an output for a selected roof by inputting current weather incident data and current roof structural data for the selected roof, and wherein the output includes a roof status of the selected roof and a recommendation to repair or replace at least a portion of the selected roof based upon the roof status.

In some aspects, the computer-based method may include receiving the current weather incident data via one or more application programming interfaces (APIs).

In some aspects, the computer-based method may include inputting the current weather incident data to the updated roof assessment model and/or inputting the current roof structural data for the selected roof to the updated roof assessment model. In some aspects, the computer-based method may include receiving the output from the updated roof assessment model. In some aspects, the computer-based method may include, based at least in part upon receiving the output from the updated roof assessment model, transmitting a message to a user computing device associated with the selected roof that causes display of a claim selector at the user computing device, wherein selection of the claim selector causes initiation of a claim associated with replacement of at least the portion of the selected roof. In some aspects, the computer-based method may include receiving an input from the user computing device associated with selection of the claim selector and/or transmitting a claim message to the user computing device that causes display of one or more data fields for entry of data associated with the claim.

In some aspects, a roof assessment (RA) computing device including at least one memory and at least one processor in communication with the at least one memory may be provided. The at least one processor may be programmed to: (i) store a roof assessment model within the at least one memory, the roof assessment model configured to determine a roof status of a selected roof after experiencing a weather event, wherein the roof assessment model is trained using historic weather incident data and historic roof structural data; (ii) output from the roof assessment model target weather event parameters for the selected roof, wherein the target weather event parameters are weather event parameters that result in at least repairable damage to the selected roof; (iii) store the target weather event parameters in the at least one memory for the selected roof; (iv) determine that the selected roof has experienced a first weather event having weather event parameters that meet the target weather event parameters; and/or (v) transmit a message to a user computing device associated with the selected roof advising that a claim associated with an insurance policy has been triggered as a result of the selected roof experiencing the first weather event.

In some aspects, the at least one processor may be programmed to receive the weather event parameters via one or more application programming interfaces (APIs).

In some aspects, the at least one processor may be programmed to train the roof assessment model using the historic weather incident data and the historic roof structural data. In some aspects, the at least one processor may be programmed to re-train the roof assessment model using updated historic weather incident data and updated roof structural data.

In some aspects, the at least one processor may be programmed to receive an input from the user computing device confirming that the claim associated with the insurance policy should be filed. In some aspects, the at least one processor may be programmed to cause the claim to be filed. In some aspects, the at least one processor may be programmed to transmit at least one message to the user computing device that causes display of one or more data fields for entry of data associated with the claim at the user computing device.

In some aspects, at least one non-transitory computer-readable storage media having computer-executable instructions embodied thereon may be provided. The instructions, when executed by at least one processor, may cause the at least one processor to: (i) store a roof assessment model in memory, the roof assessment model configured to determine a roof status of a selected roof after experiencing a weather event, wherein the roof assessment model is trained using historic weather incident data and historic roof structural data; (ii) output from the roof assessment model target weather event parameters for the selected roof, wherein the target weather event parameters are weather event parameters that result in at least repairable damage to the selected roof; (iii) store the target weather event parameters in the memory for the selected roof; (iv) determine that the selected roof has experienced a first weather event having weather event parameters that meet the target weather event parameters; and/or (v) transmit a message to a user computing device associated with the selected roof advising that a claim associated with an insurance policy has been triggered as a result of the selected roof experiencing the first weather event.

In some aspects, the instructions may cause the at least one processor to receive the weather event parameters via one or more application programming interfaces (APIs).

In some aspects, the instructions may cause the at least one processor to train the roof assessment model using the historic weather incident data and the historic roof structural data. In some aspects, the instructions may cause the at least one processor to re-train the roof assessment model using updated historic weather incident data and updated roof structural data.

In some aspects, the instructions may cause the at least one processor to receive an input from the user computing device confirming that the claim associated with the insurance policy should be filed. In some aspects, the instructions may cause the at least one processor to cause the claim to be filed. In some aspects, the instructions may cause the at least one processor to transmit at least one message to the user computing device that causes display of one or more data fields for entry of data associated with the claim at the user computing device.

In some aspects, a computer-based method implemented by at least one processor in communication with at least one memory may be provided. The computer-based method may include: (i) storing a roof assessment model within a memory, the roof assessment model configured to determine a roof status of a selected roof after experiencing a weather event, wherein the roof assessment model is trained using historic weather incident data and historic roof structural data; (ii) outputting from the roof assessment model target weather event parameters for the selected roof, wherein the target weather event parameters are weather event parameters that result in at least repairable damage to the selected roof; (iii) storing the target weather event parameters in the memory for the selected roof; (iv) determining that the selected roof has experienced a first weather event having weather event parameters that meet the target weather event parameters; and/or (v) transmitting a message to a user computing device associated with the selected roof advising that a claim associated with an insurance policy has been triggered as a result of the selected roof experiencing the first weather event.

In some aspects, the computer-based method may include receiving the weather event parameters via one or more application programming interfaces (APIs).

In some aspects, the computer-based method may include training the roof assessment model using the historic weather incident data and the historic roof structural data. In some aspects, the computer-based method may include re-training the roof assessment model using updated historic weather incident data and updated roof structural data.

In some aspects, the computer-based method may include receiving an input from the user computing device confirming that the claim associated with the insurance policy should be filed and/or causing the claim to be filed. In some aspects, the computer-based method may include receiving an input from the user computing device confirming that the claim associated with the insurance policy should be filed and/or transmitting at least one message to the user computing device that causes display of one or more data fields for entry of data associated with the claim at the user computing device.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied, or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only and are thus not intended to limit in any way the definition and/or meaning of the term "processor."

As used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are example only and are thus not limiting as to the types of memory usable for storage of a computer program.

In one embodiment, a computer program is provided, and the program is embodied on a computer readable medium. In an exemplary embodiment, the system may be executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112 (f) unless traditional means-plus-function language is expressly recited, such as "means for" or "step for" language being expressly recited in the claim(s).

This written description uses examples to disclose the disclosure, including the best mode, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A roof assessment (RA) computing device comprising at least one memory and at least one processor in communication with the at least one memory, wherein the at least one processor is programmed to:

store a roof assessment model within the at least one memory, the roof assessment model configured to determine, prior to a weather event occurring, a projected roof status of a selected roof after experiencing the weather event, wherein the roof assessment model is trained using historical weather incident data and historical roof structural data;

output from the roof assessment model target weather event parameters for the selected roof that include weather event parameters resulting in a projected damaged roof status for the selected roof that includes repairable damage to the selected roof;

store, in the at least one memory, the target weather event parameters for the selected roof, a geographic location of the selected roof, and a policy that is triggered based upon the target weather event parameters occurring;

receive weather data from a weather source computer system via one or more application programming interfaces (APIs), the weather data representing a first weather event at the geographic location;

determine that the first weather event occurred at the geographic location and has first weather event parameters that meet the target weather event parameters based upon the weather data;

based upon the first weather event occurring at the geographic location and the first weather event parameters meeting the target weather event parameters, transmit a notification to a user computing device associated with the selected roof advising that the selected roof has experienced the first weather event comprising the first weather event parameters that meet the target weather event parameters for triggering the policy;

cause display, on the user computing device, of one or more data fields associated with receiving settlement for triggering the policy; and automatically input the one or more data fields to complete settlement for the triggering of the policy.

2. The RA computing device of claim 1, wherein the at least one processor is further programmed to receive the first weather event parameters via the one or more APIs.

3. The RA computing device of claim 1, wherein the at least one processor is further programmed to train the roof assessment model using the historical weather incident data and the historical roof structural data.

4. The RA computing device of claim 3, wherein the at least one processor is further programmed to re-train the roof assessment model using updated historical weather incident data and updated historical roof structural data.

5. The RA computing device of claim 1, wherein in response to transmitting the notification, the at least one processor is further programmed to receive an input from the user computing device requesting that a claim associated with the policy be generated and processed.

6. The RA computing device of claim 5, wherein the at least one processor is further programmed to cause the claim to be filed.

7. At least one non-transitory computer-readable storage media having computer-executable instructions embodied thereon, wherein when executed by at least one processor, the computer-executable instructions cause the at least one processor to:

store a roof assessment model in memory, the roof assessment model configured to determine, prior to a weather event occurring, a projected roof status of a selected roof after experiencing the weather event, wherein the roof assessment model is trained using historical weather incident data and historical roof structural data;

output from the roof assessment model target weather event parameters for the selected roof that include weather event parameters resulting in a projected damaged roof status for the selected roof that includes repairable damage to the selected roof;

store, in the memory, the target weather event parameters for the selected roof, a geographic location of the selected roof, and a policy that is triggered based upon the target weather event parameters occurring;

receive weather data from a weather source computer system via one or more application programming interfaces (APIs), the weather data representing a first weather event at the geographic location;

determine that the first weather event occurred at the geographic location and has first weather event parameters that meet the target weather event parameters based upon the weather data;

based upon the first weather event occurring at the geographic location and the first weather event parameters meeting the target weather event parameters, transmit a notification to a user computing device associated with the selected roof advising that the selected roof has experienced the first weather event comprising the first weather event parameters that meet the target weather event parameters for triggering the policy;

cause display, on the user computing device, of one or more data fields associated with receiving settlement for triggering the policy; and automatically input the one or more data fields to complete settlement for the triggering of the policy.

8. The at least one non-transitory computer-readable storage media of claim 7, wherein the computer-executable instructions further cause the at least one processor to receive the first weather event parameters via the one or more APIs.

9. The at least one non-transitory computer-readable storage media of claim 7, wherein the computer-executable instructions further cause the at least one processor to train the roof assessment model using the historical weather incident data and the historical roof structural data.

10. The at least one non-transitory computer-readable storage media of claim 9, wherein the computer-executable instructions further cause the at least one processor to re-train the roof assessment model using updated historical weather incident data and updated historical roof structural data.

11. The at least one non-transitory computer-readable storage media of claim 7, wherein in response to transmitting the notification, the computer-executable instructions further cause the at least one processor to receive an input from the user computing device requesting that a claim associated with the policy be generated and processed.

12. The at least one non-transitory computer-readable storage media of claim 11, wherein the computer-executable instructions further cause the at least one processor to cause the claim to be filed.

13. A computer-based method implemented by at least one processor in communication with at least one memory, the computer-based method comprising:

storing a roof assessment model within a memory, the roof assessment model configured to determine, prior to a weather event occurring, a projected roof status of a selected roof after experiencing the weather event, wherein the roof assessment model is trained using historical weather incident data and historical roof structural data;

outputting from the roof assessment model target weather event parameters for the selected roof that include weather event parameters resulting in a projected damaged roof status for the selected roof that includes repairable damage to the selected roof;

storing, in the memory, the target weather event parameters for the selected roof, a geographic location of the selected roof, and a policy that is triggered based upon the target weather event parameters occurring;

receiving weather data from a weather source computer system via one or more application programming interfaces (APIs), the weather data associated with a first weather event at the geographic location;

determining that the first weather event occurred at the geographic location and has first weather event parameters that meet the target weather event parameters based upon the weather data;

based upon the first weather event occurring at the geographic location and the first weather event parameters meeting the target weather event parameters, transmitting a notification to a user computing device associated with the selected roof advising that the selected roof has experienced the first weather event comprising the first weather event parameters that meet the target weather event parameters for triggering the policy;

causing display, on the user computing device, of one or more data fields associated with receiving settlement for triggering the policy; and automatically inputting the one or more data fields to complete settlement for the triggering of the policy.

14. The computer-based method of claim 13, further comprising receiving the first weather event parameters via the one or more APIs.

15. The computer-based method of claim 13, further comprising training the roof assessment model using the historical weather incident data and the historical roof structural data.

16. The computer-based method of claim 15, further comprising re-training the roof assessment model using updated historical weather incident data and updated historical roof structural data.

17. The computer-based method of claim 13, further comprising:

receiving an input from the user computing device requesting that a claim associated with the policy be filed; and causing the claim to be filed.

18. The RA computing device of claim 1, wherein the at least one processor is further programmed to transmit the notification only based upon the first weather event occurring at the geographic location and the first weather event parameters meeting the target weather event parameters and without receiving inspection data associated with an in-person or electronic inspection of the selected roof.

* * * * *